(12) United States Patent
Obama

(10) Patent No.: US 10,948,700 B2
(45) Date of Patent: *Mar. 16, 2021

(54) VARIABLE MAGNIFICATION OPTICAL SYSTEM, OPTICAL DEVICE, AND METHOD FOR PRODUCING VARIABLE MAGNIFICATION OPTICAL SYSTEM

(71) Applicant: NIKON CORPORATION, Tokyo (JP)

(72) Inventor: Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 246 days.

This patent is subject to a terminal disclaimer.

(21) Appl. No.: 15/988,845

(22) Filed: May 24, 2018

(65) Prior Publication Data

US 2018/0267278 A1 Sep. 20, 2018

Related U.S. Application Data

(63) Continuation of application No. 15/636,616, filed on Jun. 28, 2017, now abandoned, which is a (Continued)

(30) Foreign Application Priority Data

Oct. 23, 2012 (JP) .............................. JP2012-233969
Oct. 23, 2012 (JP) .............................. JP2012-233970

(51) Int. Cl.
*G02B 9/34* (2006.01)
*G02B 15/16* (2006.01)
(Continued)

(52) U.S. Cl.
CPC ........... *G02B 15/16* (2013.01); *G02B 15/173* (2013.01); *G02B 27/0025* (2013.01)

(58) Field of Classification Search
CPC .. G02B 15/16; G02B 27/0025; G02B 15/173; G02B 9/34
See application file for complete search history.

(56) References Cited

U.S. PATENT DOCUMENTS 4,696,553 A 9/1987 Tsuji et al.
5,341,243 A 8/1994 Okuyama et al.
(Continued)

FOREIGN PATENT DOCUMENTS

JP 58-179809 10/1983
JP 04-358108 12/1992
(Continued)

OTHER PUBLICATIONS

International Search Report from International Patent Application No. PCT/JP2013/078545, dated Feb. 4, 2014.
(Continued)

*Primary Examiner* — Joseph P Martinez
(74) *Attorney, Agent, or Firm* — SGPatents PLLC

(57) ABSTRACT

Comprising, in order from an object side: a first lens group G1 having positive refractive power; a second lens group G2 having negative refractive power; an aperture stop S; a third lens group G3 having positive refractive power; and a fourth lens group G4 having positive refractive power; upon zooming from a wide-angle end state to a telephoto end state, the distance between the first lens group G1 and the second lens group G2, the distance between the second lens group G2 and the aperture stop S, the distance between the aperture stop S and the third lens group G3, and the distance between the third lens group G3 and the fourth lens group G4 being varied, and the distance between the aperture stop S and the fourth lens group G4 being constant; and a predetermined conditional expression being satisfied, thereby providing a variable magnification optical system which is compact in size and has a high variable magnification ratio and high (Continued)

optical performance, an optical apparatus, and a method for manufacturing a variable magnification optical system.

14 Claims, 9 Drawing Sheets

Related U.S. Application Data continuation of application No. 14/693,916, filed on Apr. 23, 2015, now Pat. No. 9,709,779, which is a continuation of application No. PCT/JP2013/078545, filed on Oct. 22, 2013.

(51) Int. Cl.
G02B 15/173 (2006.01)
G02B 27/00 (2006.01)

(56) References Cited

U.S. PATENT DOCUMENTS

| | | | |
|---|---|---|---|
| 5,448,412 A | 9/1995 | Maruyama et al. | |
| 5,572,277 A | 11/1996 | Uzawa et al. | |
| 5,930,051 A | 7/1999 | Sato | |
| 6,061,180 A | 5/2000 | Hayakawa | |
| 6,191,895 B1 * | 2/2001 | Arimoto | G02B 15/173 359/686 |
| 6,867,925 B1 | 3/2005 | Sato | |
| 7,830,613 B2 | 11/2010 | Ichikawa | |
| 2004/0184160 A1 | 9/2004 | Nishina et al. | |
| 2005/0185288 A1 | 8/2005 | Nishina et al. | |
| 2005/0195492 A1 | 9/2005 | Nishina et al. | |
| 2005/0195493 A1 | 9/2005 | Nishina et al. | |
| 2007/0217024 A1 | 9/2007 | Kamo et al. | |
| 2008/0049333 A1 | 2/2008 | Satori | |
| 2008/0198476 A1 | 8/2008 | Kimura | |
| 2008/0212201 A1 | 9/2008 | Sato | |
| 2009/0174949 A1 | 7/2009 | Watanabe | |
| 2009/0296232 A1 | 12/2009 | Okada | |
| 2009/0316277 A1 | 12/2009 | Ichikawa | |
| 2011/0194016 A1 | 8/2011 | Noda | |
| 2011/0261469 A1 | 10/2011 | Arai | |
| 2012/0262800 A1 | 10/2012 | Eguchi et al. | |
| 2013/0215317 A1 | 8/2013 | Kawamura | |

FOREIGN PATENT DOCUMENTS

| | | |
|---|---|---|
| JP | 06-027373 | 2/1994 |
| JP | 06-214160 | 8/1994 |
| JP | 07-005361 A | 1/1995 |
| JP | 08-050244 A | 2/1996 |
| JP | 10-133111 A | 5/1998 |
| JP | 10-282413 A | 10/1998 |
| JP | 11-109241 A | 4/1999 |
| JP | 2000-347102 A | 12/2000 |
| JP | 2001-318312 A | 11/2001 |
| JP | 2002-072089 A | 3/2002 |
| JP | 2002-228931 A | 8/2002 |
| JP | 2004-286811 A | 10/2004 |
| JP | 2007-047538 A | 2/2007 |
| JP | 2007-240747 A | 9/2007 |
| JP | 2008-052116 A | 3/2008 |
| JP | 2008-076513 A | 4/2008 |
| JP | 2008-203415 A | 9/2008 |
| JP | 2008-209741 A | 9/2008 |
| JP | 2008-292562 A | 12/2008 |
| JP | 2009-134001 A | 6/2009 |
| JP | 2009-294304 A | 12/2009 |
| JP | 2010-002684 A | 1/2010 |
| JP | 2011-002503 A | 1/2011 |
| JP | 2011-102894 A | 5/2011 |
| JP | 2011-164290 A | 8/2011 |
| JP | 2011-197058 A | 10/2011 |
| JP | 2011-232502 A | 11/2011 |
| WO | WO 2012/046449 A1 | 4/2012 |

OTHER PUBLICATIONS

English Translation of International Preliminary Report on Patentability from International Patent Application No. PCT/JP2013/078545, dated May 7, 2015.

Office Action dated Jul. 25, 2017 in Japanese Patent Application No. 2012-233970.

Office Action dated Jun. 24, 2020, in Chinese Patent Application No. 201810054204.1.

Office Action dated Jun. 24, 2020, in Chinese Patent Application No. 201810052583.0.

* cited by examiner

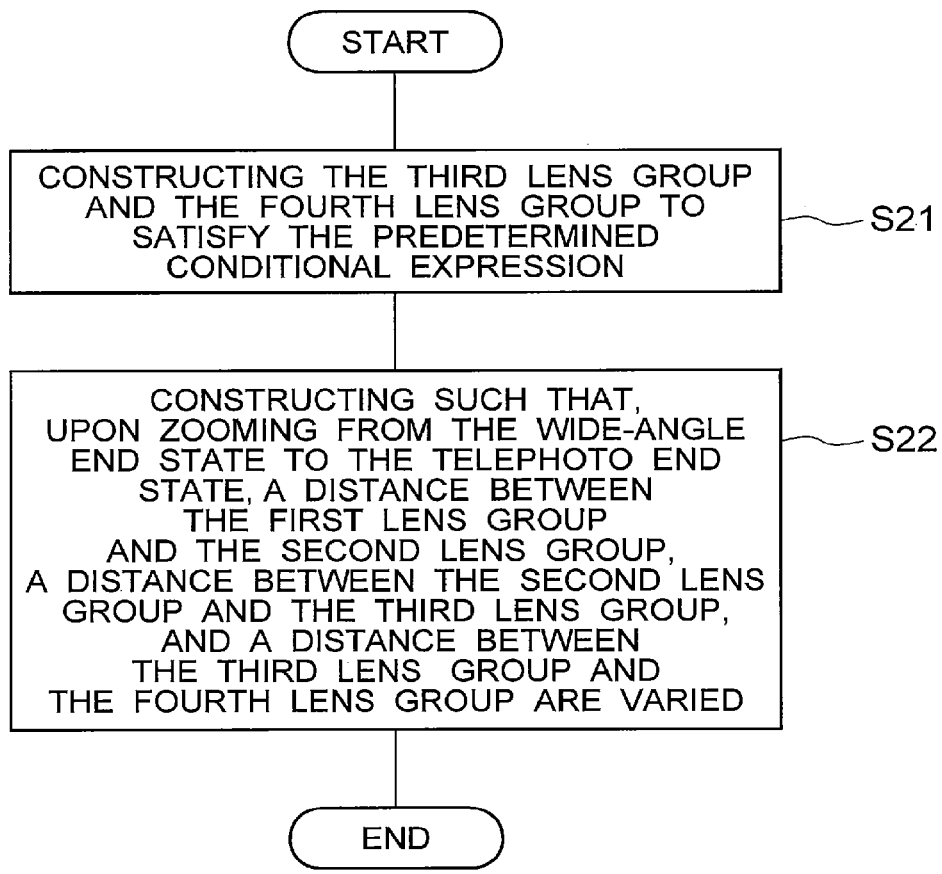

VARIABLE MAGNIFICATION OPTICAL SYSTEM, OPTICAL DEVICE, AND METHOD FOR PRODUCING VARIABLE MAGNIFICATION OPTICAL SYSTEM

TECHNICAL FIELD

The present invention relates to a variable magnification optical system, an optical device, and a method for producing the variable magnification optical system.

BACKGROUND ART

There has been proposed a variable magnification optical system whose most object side lens group has positive refractive power and which is suitable for an interchangeable lens for a photographing camera, an electronic still camera, a video camera or the like, for example, in Japanese Patent application Laid-Open No. 2008-292562.

PRIOR ART DOCUMENT

Patent Document

Patent Document 1: Japanese Patent application Laid-Open Gazette No. 2008-292562

SUMMARY OF THE INVENTION

Problem to be Solved by the Invention

However, in the conventional variable magnification optical system as described above, there was a problem that, even if it was intended to attain high magnification ratio without making large in size, sufficiently high optical performance could not have been realized.

The present invention is made in view of the above-described problem, and has an object to provide a variable magnification optical system that is downsized and has high variable magnification ratio and high optical performance, an optical apparatus, and a method for manufacturing the variable magnification optical system.

Means for Solving the Problem

In order to solve the above-mentioned object, according to a first aspect of the present invention, there is provided a variable magnification optical system comprising, in order from an object side: a first lens group having positive refractive power; a second lens group having negative refractive power; an aperture stop; a third lens group having positive refractive power; and a fourth lens group having positive refractive power;

upon zooming from a wide-angle end state to a telephoto end state, a distance between the first lens group and the second lens group, a distance between the second lens group and the aperture stop, a distance between the aperture stop and the third lens group, and a distance between the third lens group and the fourth lens group being varied, and a distance between the aperture stop and the fourth lens group being constant; and the following conditional expression being satisfied:

$$5.300 < f1/fw < 8.000$$

where fw denotes a focal length of the variable magnification optical system in the wide angle end state, and f1 denotes a focal length of the first lens group.

Further, according to a second aspect of the present invention, there is provided an optical apparatus equipped with the variable magnification optical system according to the first aspect of the present invention.

Further, according to a third aspect of the present invention, there is provided a variable magnification optical system comprising, in order from an object side: a first lens group having positive refractive power; a second lens group having negative refractive power; a third lens group having positive refractive power; and a fourth lens group having positive refractive power;

upon zooming from a wide-angle end state to a telephoto end state, a distance between the first lens group and the second lens group, a distance between the second lens group and the third lens group, and a distance between the third lens group and the fourth lens group being varied; and the following conditional expression being satisfied:

$$0.160 < (d3t-d3w)/fw < 0.550$$

where fw denotes a focal length of the variable magnification optical system in the wide angle end state, d3w denotes a distance from the most image side lens surface of the third lens group to the most object side lens surface of the fourth lens group in the wide angle end state, and d3t denotes a distance from the most image side lens surface of the third lens group to the most object side lens surface of the fourth lens group in the telephoto end state.

Further, according to a fourth aspect of the present invention, there is provided an optical apparatus equipped with the variable magnification optical system according to the third aspect of the present invention.

Further, according to a fifth aspect of the present invention, there is provided a method for manufacturing a variable magnification optical system comprising, in order from an object side: a first lens group having positive refractive power; a second lens group having negative refractive power; an aperture stop; a third lens group having positive refractive power; and a fourth lens group having positive refractive power;

the method comprising the steps of:

constructing the first lens group to satisfy the following conditional expression:

$$5.300 < f1/fw < 8.000$$

where fw denotes a focal length of the variable magnification optical system in a wide angle end state, and f1 denotes a focal length of the first lens group; and constructing such that, upon zooming from the wide angle end state to a telephoto end state, a distance between the first lens group and the second lens group, a distance between the second lens group and the aperture stop, a distance between the aperture stop and the third lens group, and a distance between the third lens group and the fourth lens group are varied, and a distance between the aperture stop and the fourth lens group is constant.

Further, according to a sixth aspect of the present invention, there is provided a method for manufacturing a variable magnification optical system comprising, in order from an object side: a first lens group having positive refractive power; a second lens group having negative refractive power; a third lens group having positive refractive power; and a fourth lens group having positive refractive power;

the method comprising the steps of:

constructing the third lens group and the fourth lens group to satisfy the following conditional expression:

$$0.160 < (d3t-d3w)/fw < 0.550$$

where fw denotes a focal length of the variable magnification optical system in a wide angle end state, d3w denote a distance from the most image side lens surface of the third lens group to the most object side lens surface of the fourth lens group in the wide angle end state, and d3t denote a distance from the most image side lens surface of the third lens group to the most object side lens surface of the fourth lens group in a telephoto end state; and constructing such that, upon zooming from the wide-angle end state to the telephoto end state, a distance between the first lens group and the second lens group, a distance between the second lens group and the third lens group, and a distance between the third lens group and the fourth lens group are varied.

Effect of the Invention

According to the present invention, there are provided a variable magnification optical system which has high variable magnification ratio, is compact in size and has excellent optical performance, an optical apparatus, and a method for manufacturing a variable magnification optical system.

BRIEF DESCRIPTION OF THE DRAWINGS

FIGS. 2A, 2B and 2C are graphs showing various aberrations of the variable magnification optical system according to the First Example of the present application upon focusing on an infinite distance object, in which FIG. 2A shows various aberrations in the wide-angle end state, FIG. 2B shows various aberrations in the intermediate focal length state, and FIG. 2C shows various aberrations in the telephoto end state.

FIGS. 4A, 4B and 4C are graphs showing various aberrations of the variable magnification optical system according to the Second Example of the present application upon focusing on an infinite distance object, in which FIG. 4A shows various aberrations in the wide-angle end state, FIG. 4B shows various aberrations in the intermediate focal length state, and FIG. 4C shows various aberrations in the telephoto end state.

FIGS. 6A, 6B and 6C are graphs showing various aberrations of the variable magnification optical system according to the Third Example of the present application upon focusing on an infinite distance object, in which FIG. 6A shows various aberrations in the wide-angle end state, FIG. 6B shows various aberrations in the intermediate focal length state, and FIG. 6C shows various aberrations in the telephoto end state.

FIG. 9 is a flowchart schematically showing a method for manufacturing the variable magnification optical system according to the second embodiment of the present application.

EMBODIMENTS FOR CARRYING OUT THE INVENTION

Figure 1A:
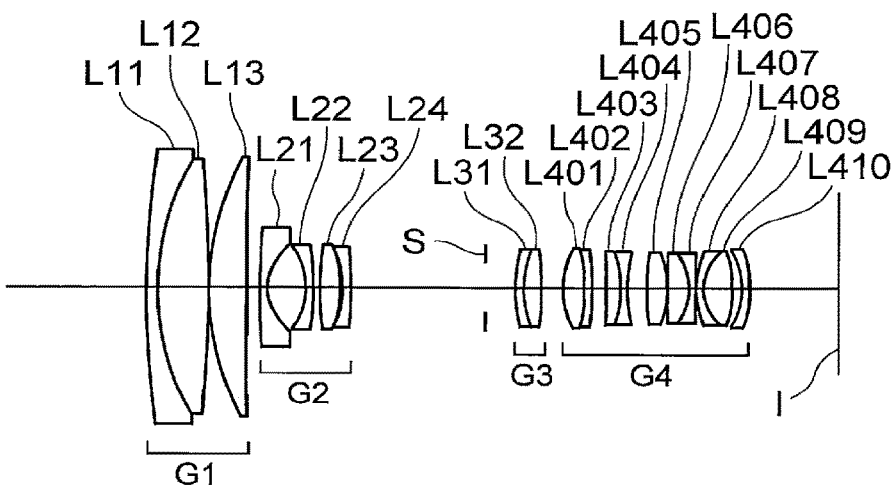
FIGS. 1A, 1B and 1C are sectional views showing a variable magnification optical system according to a First Example that is common to a first and a second embodiments of the present application, in a wide angle end state, in an intermediate focal length state and in a telephoto end state, respectively.

A variable magnification optical system according to the first embodiment of the present application, an optical apparatus and a method for manufacturing the variable magnification optical system are explained below.

The variable magnification optical system according to the first embodiment of the present application is characterized in that the system comprises, in order from an object side: a first lens group having positive refractive power; a second lens group having negative refractive power; an aperture stop; a third lens group having positive refractive power; and a fourth lens group having positive refractive power, and upon zooming from a wide-angle end state to a telephoto end state, a distance between the first lens group and the second lens group, a distance between the second lens group and the aperture stop, a distance between the aperture stop and the third lens group, and a distance between the third lens group and the fourth lens group are varied. With such configuration, the variable magnification optical system according to the first embodiment of the present application can realize the zooming from a wide-angle end state to a telephoto end state and can suppress variation in each of the distortion, astigmatism and spherical aberration in association with the zooming.

The variable magnification optical system according to the first embodiment of the present application is also characterized in that, upon zooming from the wide angle end state to the telephoto end state, the distance between the aperture stop and the fourth lens group is constant. With such construction, the variable magnification optical system according to the first embodiment of the present application can suppress variation in the astigmatism and variation in the coma aberration, occurring in the third lens group in association with the zooming.

Further, the variable magnification optical system according to the first embodiment of the present application is characterized in that the following conditional expression (1) is satisfied:

$$5.300 < f1/fw < 8.000 \qquad (1)$$

where fw denotes a focal length of the variable magnification optical system in the wide angle end state; and f1 denotes a focal length of the first lens group.

The conditional expression (1) defines a proper range of the focal length of the first lens group. The variable magnification optical system according to the first embodiment of the present application can suppress the variation in the spherical aberration and the variation in the astigmatism upon zooming, by satisfying the conditional expression (1).

When the value of f1/fw is equal to or falls below the lower limit of the conditional expression (1) for the variable magnification optical system according to the first embodiment of the present application, it becomes difficult to suppress the variation in the spherical aberration and the variation in the astigmatism occurring in the first lens group upon zooming, with the result that high optical performance cannot be realized. Meanwhile, in order to further ensure the advantageous effect of the present application, it is more preferable to set the lower limit value of the conditional expression (1) to 5.900. Moreover, in order to still further ensure the advantageous effect of the present application, it is still more preferable to set the lower limit value of the conditional expression (1) to 6.135.

On the other hand, when the value of f1/fw is equal to or exceeds the upper limit of the conditional expression (1) for the variable magnification optical system according to the first embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the ratio of the diameter of an on-axis light flux incident on the first lens group to the diameter of an on-axis light flux incident on the second lens group largely varies in connection with zooming. Consequently, the variation in the spherical aberration becomes excessively large upon zooming, so that the realization of high optical performance is impossible. Additionally, in order to further ensure the advantageous effect of the present application, it is more preferable to set the upper limit value of the conditional expression (1) to 6.900.

With the above described construction, it is possible to realize a variable magnification optical system which is compact in size and has a high variable magnification ratio and high optical performance.

In the variable magnification optical system according to the first embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the first embodiment of the present application, it is desired that the distance between the first lens group and the second lens group is increased upon zooming from the wide-angle end state to the telephoto end state. With such configuration, the magnification of the second lens group can be increased. Consequently, while a high variable magnification ratio is realized efficiently, the variation in the spherical aberration and the variation in the astigmatism can be suppressed upon zooming.

In the variable magnification optical system according to the first embodiment of the present application, it is desired that the distance between the second lens group and the third lens group is increased upon zooming from the wide-angle end state to the telephoto end state. With such configuration, the composite magnification of the third lens group and fourth lens group can be increased. Consequently, with a high variable magnification ratio being realized efficiently, the variation in the spherical aberration and the variation in the astigmatism can be suppressed upon zooming.

In the variable magnification optical system according to the first embodiment of the present application, it is desirable that the following conditional expression (2) is satisfied:

$$3.250 < (d1t - d1w)/fw < 4.200 \quad (2)$$

where fw denotes a focal length of the variable magnification optical system in the wide angle end state; d1w denotes a distance from the most image side lens surface of the first lens group to the most object side lens surface of the second lens group in the wide angle end state; and d1t denotes a distance from the most image side lens surface of the first lens group to the most object side lens surface of the second lens group in the telephoto end state.

The conditional expression (2) defines a distance along the optical axis from the most image side lens surface of the first lens group to the most object side lens surface of the second lens group, in other words, a proper range of an amount of variation in the distance between the first lens group and the second lens group upon zooming. By satisfying the conditional expression (2), the variable magnification optical system according to the first embodiment of the present application can suppress the variation in the spherical aberration and variation in the astigmatism upon zooming.

When the value of (d1t−d1w)/fw is equal to or falls below the lower limit of the conditional expression (2) for the variable magnification optical system according to the first embodiment of the present application, in order to obtain a predetermined variable magnification ratio, it is necessary to make larger the refractive power of the second lens group. Owing to this, it becomes difficult to suppress the variation in the spherical aberration and variation in the astigmatism occurring in the second lens group upon zooming, so that the realization of high optical performance is impossible. Meanwhile, in order to further ensure the advantageous effect of the present application, it is more preferable to set the lower limit value of the conditional expression (2) to 3.450. Moreover, in order to still further ensure the advantageous effect of the present application, it is still more preferable to set the lower limit value of the conditional expression (2) to 3.510.

On the other hand, when the value of (d1t−d1w)/fw is equal to or exceeds the upper limit of the conditional expression (2) for the variable magnification optical system according to the first embodiment of the present application, the ratio of the diameter of an on-axis light flux incident on the first lens group to the diameter of an on-axis light flux incident on the second lens group largely varies in connection with the zooming. Consequently, the variation in the spherical aberration becomes excessively large upon zooming, so that the realization of high optical performance is impossible. Meanwhile, in order to further ensure the advantageous effect of the present application, it is more preferable to set the upper limit value of the conditional expression (2) to 4.000. Moreover, in order to still further ensure the advantageous effect of the present application, it is still more preferable to set the upper limit value of the conditional expression (2) to 3.860.

In the variable magnification optical system according to the first embodiment of the present application, it is desirable that the following conditional expression (3) is satisfied:

$$0.160 < (d3t - d3w)/fw < 0.550 \quad (3)$$

where fw denotes a focal length of the variable magnification optical system in the wide angle end state; d3w denotes a distance from the most image side lens surface of the third lens group to the most object side lens surface of the fourth lens group in the wide angle end state; and d3t denotes a distance from the most image side lens surface of the third lens group to the most object side lens surface of the fourth lens group in the telephoto end state.

The conditional expression (3) defines a distance along the optical axis from the most image side lens surface of the third lens group to the most object side lens surface of the fourth lens group, in other words, a proper range of an amount of variation in the distance between the third lens group and the fourth lens group upon zooming. By satisfying the conditional expression (3), the variable magnification optical system according to the first embodiment of the present application can suppress the variation in the coma aberration and variation in the astigmatism upon zooming.

When the value of (d3t−d3w)/fw is equal to or falls below the lower limit of the conditional expression (3) for the variable magnification optical system according to the first embodiment of the present application, it becomes difficult to suppress the variation in the coma aberration and variation in the astigmatism occurring in the third lens group upon zooming, with the result that high optical performance cannot be realized. Additionally, in order to further ensure the advantageous effect of the present application, it is more preferable to set the lower limit value of the conditional expression (3) to 0.172.

On the other hand, when the value of (d3t−d3w)/fw is equal to or exceeds the upper limit of the conditional expression (3) for the variable magnification optical system according to the first embodiment of the present application, a mechanism is necessary to make larger an amount of variation in the distance between the third lens group and the fourth lens group upon zooming. Owing to this, downsizing of the apparatus becomes difficult, and additionally, the third lens group and the fourth lens group tend to mutually decenter. Consequently, the decentering coma aberration and astigmatism tend to occur in association with variations during manufacturing, with the result that high optical performance cannot be realized. Meanwhile, in order to further ensure the advantageous effect of the present application, it is more preferable to set the upper limit value of the conditional expression (3) to 0.450.

In the variable magnification optical system according to the first embodiment of the present application, it is desirable that the following conditional expression (4) is satisfied:

$$0.140 < (d2it-d2iw)/fw < 0.700 \quad (4)$$

where fw denotes a focal length of the variable magnification optical system in the wide angle end state; d2iw denotes a distance from the most image side lens surface of the second lens group to an image plane in the wide angle end state, and d2it denotes a distance from the most image side lens surface of the second lens group to the image plane in the telephoto end state.

The conditional expression (4) defines a distance along the optical axis from the most image side lens surface of the second lens group to an image plane, in other words, a proper range of an amount of variation in a distance between the second lens group and the image plane upon zooming. By satisfying the conditional expression (4), the variable magnification optical system according to the first embodiment of the present application can suppress the variation in the spherical aberration and variation in the astigmatism upon zooming.

When the value of (d2it−d2iw)/fw is equal to or falls below the lower limit of the conditional expression (4) for the variable magnification optical system according to the first embodiment of the present application, in order to obtain a predetermined variable magnification ratio, it is necessary to make larger the refractive power of the second lens group. Owing to this, it becomes difficult to suppress the variation in the spherical aberration and variation in the astigmatism occurring in the second lens group upon zooming, with the result that high optical performance cannot be realized. Meanwhile, in order to further ensure the advantageous effect of the present application, it is more preferable to set the lower limit value of the conditional expression (4) to 0.170. Moreover, in order to still further ensure the advantageous effect of the present application, it is still more preferable to set the lower limit value of the conditional expression (4) to 0.200.

On the other hand, when the value of (d2it−d2iw)/fw is equal to or exceeds the upper limit of the conditional expression (4) for the variable magnification optical system according to the first embodiment of the present application, it becomes difficult to suppress the variation in the spherical aberration and variation in the astigmatism occurring in the first lens group and the second lens group upon zooming, with the result that high optical performance cannot be realized.

In the variable magnification optical system according to the first embodiment of the present application, it is desirable that the third lens group is composed of two lens elements. With such construction, it is possible to suppress the spherical aberration, coma aberration and axial chromatic aberration occurring in the third lens group compared with a case wherein the third lens group is composed of one lens element. It is also possible to suppress the variation in each of the spherical aberration, coma aberration and axial chromatic aberration upon zooming. Furthermore, it is possible to downsize the apparatus and additionally reduce the mass of the third lens group compared with a case wherein the third lens group is composed of three or more lens elements. Consequently, eccentricity of the third lens group due to position difference of the optical system can be relatively suppressed in its use state, with the result that the occurrence of the eccentric coma can be reduced.

It is more preferable that the third lens group is composed of two lens element and the two lens elements are cemented together. With this construction, it is possible to reduce the eccentricity among the lens elements in the third lens group so that the occurrence of the eccentric coma can be reduced.

In the variable magnification optical system according to the first embodiment of the present application, it is desirable that the following conditional expression (5) is satisfied:

$$0.200 < f3/f4 < 0.650 \quad (5)$$

where f3 denotes a focal length of the third lens group, and f4 denotes a focal length of the fourth lens group.

The conditional expression (5) defines a proper range of the ratio of focal length between the third lens group and the fourth lens. By satisfying the conditional expression (5), the variable magnification optical system according to the first embodiment of the present application can suppress the variation in the spherical aberration and variation in the astigmatism upon zooming.

When the value of f3/f4 is equal to or falls below the lower limit of the conditional expression (5) for the variable magnification optical system according to the first embodiment of the present application, it becomes difficult to suppress the variation in the spherical aberration and variation in the astigmatism occurring in the third lens group upon zooming, with the result that high optical performance cannot be realized. Meanwhile, in order to further ensure the advantageous effect of the present application, it is more preferable to set the lower limit value of the conditional expression (5) to 0.400.

On the other hand, when the value of f3/f4 is equal to or exceeds the upper limit of the conditional expression (5) for the variable magnification optical system according to the first embodiment of the present application, it becomes difficult to suppress the variation in the spherical aberration and variation in the astigmatism occurring in the fourth lens group upon zooming, with the result that high optical performance cannot be realized. Further, in order to further ensure the advantageous effect of the present application, it is more preferable to set the upper limit value of the conditional expression (5) to 0.500.

In the variable magnification optical system according to the first embodiment of the present application, it is desirable that the following conditional expression (6) is satisfied:

$$0.780 < f1/f4 < 1.300 \tag{6}$$

where f1 denotes a focal length of the first lens group, and f4 denotes a focal length of the fourth lens group.

The conditional expression (6) defines a proper range of the ratio of focal length between the first lens group and the fourth lens. By satisfying the conditional expression (6), the variable magnification optical system according to the first embodiment of the present application can suppress the variation in the spherical aberration and variation in the astigmatism upon zooming.

When the value of f1/f4 is equal to or falls below the lower limit of the conditional expression (6) for the variable magnification optical system according to the first embodiment of the present application, it becomes difficult to suppress the variation in the spherical aberration and variation in the astigmatism occurring in the first lens group upon zooming, with the result that high optical performance cannot be realized. Meanwhile, in order to further ensure the advantageous effect of the present application, it is more preferable to set the lower limit value of the conditional expression (6) to 0.820.

On the other hand, when the value of f1/f4 is equal to or exceeds the upper limit of the conditional expression (6) for the variable magnification optical system according to the first embodiment of the present application, it becomes difficult to suppress the variation in the spherical aberration and variation in the astigmatism occurring in the fourth lens group upon zooming, with the result that high optical performance cannot be realized. Meanwhile, in order to further ensure the advantageous effect of the present application, it is more preferable to set the upper limit value of the conditional expression (6) to 1.100.

In the variable magnification optical system according to the first embodiment of the present application, it is desirable that the following conditional expression (7) is satisfied:

$$0.050 < (-f2)/f4 < 0.250 \tag{7}$$

where f2 denotes a focal length of the second lens group, and f4 denotes a focal length of the fourth lens group.

The conditional expression (7) defines a proper range of the ratio of focal length between the second lens group and the fourth lens. By satisfying the conditional expression (7), the variable magnification optical system according to the first embodiment of the present application can suppress variation in each of the spherical aberration, astigmatism and distortion upon zooming.

When the value of (−f2)/f4 is equal to or falls below the lower limit of the conditional expression (7) for the variable magnification optical system according to the first embodiment of the present application, it becomes difficult to suppress variation in each of the spherical aberration, astigmatism and distortion occurring in the second lens group upon zooming, with the result that high optical performance cannot be realized. Meanwhile, in order to further ensure the advantageous effect of the present application, it is more preferable to set the lower limit value of the conditional expression (7) to 0.118.

On the other hand, when the value of (−f2)/f4 is equal to or exceeds the upper limit of the conditional expression (7) for the variable magnification optical system according to the first embodiment of the present application, it becomes difficult to suppress the variation in the spherical aberration and variation in the astigmatism occurring in the fourth lens group upon zooming, with the result that high optical performance cannot be realized. Meanwhile, in order to further ensure the advantageous effect of the present application, it is more preferable to set the upper limit value of the conditional expression (7) to 0.180.

In the variable magnification optical system according to the first embodiment of the present application, it is desirable that the following conditional expression (8) is satisfied:

$$0.740 < (-f2)/fw < 1.120 \tag{8}$$

where fw denotes a focal length of the variable magnification optical system in the wide-angle end state, and f2 denotes a focal length of the second lens group.

The conditional expression (8) defines a proper range of the focal length of the second lens group. By satisfying the conditional expression (8), the variable magnification optical system according to the first embodiment of the present application can suppress the variation in the spherical aberration and variation in the astigmatism upon zooming.

When the value of (−f2)/fw is equal to or falls below the lower limit of the conditional expression (8) for the variable magnification optical system according to the first embodiment of the present application, it becomes difficult to suppress the variation in the spherical aberration and variation in the astigmatism occurring in the second lens group upon zooming, with the result that high optical performance cannot be realized. Meanwhile, in order to further ensure the advantageous effect of the present application, it is more preferable to set the lower limit value of the conditional expression (8) to 0.860.

On the other hand, when the value of (−f2)/fw is equal to or exceeds the upper limit of the conditional expression (8) for the variable magnification optical system according to the first embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the diameter of an on-axis light flux incident from the first lens group to the second lens group largely varies in connection with zooming. Consequently, the variation in the spherical aberration becomes excessively large upon zooming, so that the realization of high optical performance is impossible. Meanwhile, in order to further ensure the advantageous effect of the present application, it is more preferable to set the upper limit value of the conditional expression (8) to 1.040.

The optical apparatus according to this application is characterized in that the apparatus is equipped with the above described variable magnification optical system according to the first embodiment of the present application. With this construction, it is possible to realize an optical apparatus which is downsized and has a high variable magnification ratio and high optical performance.

The method for manufacturing the variable magnification optical system according to the first embodiment of the present application is a method for manufacturing a variable magnification optical system comprising, in order from an object side: a first lens group having positive refractive power; a second lens group having negative refractive power; an aperture stop; a third lens group having positive refractive power; and a fourth lens group having positive refractive power;

the method comprising the steps of:
constructing the first lens group to satisfy the following conditional expression (1); and
constructing such that, upon zooming from a wide angle end state to a telephoto end state, a distance between the first lens group and the second lens group, a distance between the second lens group and the aperture stop, a distance between the aperture stop and the third lens group, and a distance between the third lens group and the fourth lens group are varied, and a distance between the aperture stop and the fourth lens group is constant. With the above described configuration, it is possible to manufacture a variable magnification optical system that is downsized and has a high variable magnification ratio and high optical performance.

$$5.300 < f1/fw < 8.000 \quad (1)$$

Where fw denotes a focal length of the variable magnification optical system in a wide angle end state, and f1 denotes a focal length of the first lens group.

A variable magnification optical system according to the second embodiment of the present application, an optical apparatus and a method for manufacturing the variable magnification optical system are explained below.

The variable magnification optical system according to the second embodiment of the present application is characterized in that the system comprises, in order from an object side: a first lens group having positive refractive power; a second lens group having negative refractive power; a third lens group having positive refractive power; and a fourth lens group having positive refractive power; and upon zooming from a wide-angle end state to a telephoto end state, a distance between the first lens group and the second lens group, a distance between the second lens group and the third lens group, and a distance between the third lens group and the fourth lens group are varied. With such configuration, the variable magnification optical system according to the second embodiment of the present application can realize the zooming from a wide-angle end state to a telephoto end state and can suppress variation in each of the distortion, astigmatism and spherical aberration in association with the zooming.

Further, the variable magnification optical system according to the second embodiment of the present application is characterized in that the following conditional expression (3) is satisfied:

$$0.160 < (d3t - d3w)/fw < 0.550 \quad (3)$$

where fw denotes a focal length of the variable magnification optical system in the wide angle end state;
d3w denotes a distance from the most image side lens surface of the third lens group to the most object side lens surface of the fourth lens group in the wide angle end state; and
d3t denotes a distance from the most image side lens surface of the third lens group to the most object side lens surface of the fourth lens group in the telephoto end state.

The conditional expression (3) defines an distance along the optical axis from the most image side lens surface of the third lens group to the most object side lens surface of the fourth lens group, in other words, a proper range of an amount of variation in a distance between the third lens group and the fourth lens group upon the zooming. By satisfying the conditional expression (3), the variable magnification optical system according to the second embodiment of the present application can suppress variation in the coma aberration and variation in the astigmatism upon the zooming.

When the value of (d3t−d3w)/fw is equal to or falls below the lower limit of the conditional expression (3) for the variable magnification optical system according to the second embodiment of the present application, it becomes difficult to suppress the variation in the coma aberration and the variation in the astigmatism occurring in the third lens group upon zooming, with the result that high optical performance cannot be realized. Meanwhile, in order to further ensure the advantageous effect of the present application, it is more preferable to set the lower limit value of the conditional expression (3) to 0.172.

On the other hand, when the value of (d3t−d3w)/fw is equal to or exceeds the upper limit of the conditional expression (3) for the variable magnification optical system according to the second embodiment of the present application, a mechanism is necessary to make larger an amount of variation in the distance between the third lens group and the fourth lens group upon zooming. Owing to this, downsizing of the apparatus becomes difficult, and additionally, the third lens group and the fourth lens group tend to mutually decenter. Consequently, the decentering coma aberration and astigmatism tend to occur in association with variations during manufacturing, with the result that the realization of high optical performance becomes impossible. Meanwhile, in order to further ensure the advantageous effect of the present application, it is more preferable to set the upper limit value of the conditional expression (3) to 0.450.

With the above described construction, it is possible to realize a variable magnification optical system which is downsized and has a high variable magnification ratio and high optical performance.

In the variable magnification optical system according to the second embodiment of the present application, it is desirable that the first lens group is moved toward the object side upon zooming from the wide-angle end state to the telephoto end state. With such configuration, it is possible to suppress variation in the height of off-axis light flux passing through the first lens group from the optical axis upon zooming. Owing to this, the diameter of the first lens group can be made smaller, and also the variation in the astigmatism can be suppressed upon zooming.

In the variable magnification optical system according to the second embodiment of the present application, it is desired that the distance between the first lens group and the second lens group is increased upon zooming from the wide-angle end state to the telephoto end state. With such configuration, the magnification of the second lens group can be increased. Consequently, while a high variable magnification ratio can be realized efficiently, the variation in the spherical aberration and the variation in the astigmatism can be suppressed upon zooming.

In the variable magnification optical system according to the second embodiment of the present application, it is desired that the distance between the second lens group and the third lens group is decreased upon zooming from the wide-angle end state to the telephoto end state. With such configuration, the composite magnification of the third lens group and fourth lens group can be increased. Consequently, while a high variable magnification ratio can be realized efficiently, the variation in the spherical aberration and the variation in the astigmatism can be suppressed upon zooming.

In the variable magnification optical system according to the second embodiment of the present application, it is desirable that the following conditional expression (2) is satisfied:

$$3.250 < (d1t - d1w)/fw < 4.200 \qquad (2)$$

where fw denotes a focal length of the variable magnification optical system in the wide angle end state; d1w denotes a distance from the most image side lens surface of the first lens group to the most object side lens surface of the second lens group in the wide angle end state; and d1t denotes a distance from the most image side lens surface of the first lens group to the most object side lens surface of the second lens group in the telephoto end state.

The conditional expression (2) defines a distance along the optical axis from the most image side lens surface of the first lens group to the most object side lens surface of the second lens group, in other words, a proper range of an amount of variation in a distance between the first lens group and the second lens group upon zooming. By satisfying the conditional expression (2), the variable magnification optical system according to the second embodiment of the present application can suppress the variation in the spherical aberration and variation in the astigmatism upon zooming.

When the value of (d1t−d1w)/fw is equal to or falls below the lower limit of the conditional expression (2) for the variable magnification optical system according to the second embodiment of the present application, in order to obtain a predetermined variable magnification ratio, it is necessary to make larger the refractive power of the second lens group. Owing to this, it becomes difficult to suppress the variation in the spherical aberration and variation in the astigmatism occurring in the second lens group upon zooming, so that the realization of high optical performance is impossible. Meanwhile, in order to further ensure the advantageous effect of the present application, it is more preferable to set the lower limit value of the conditional expression (2) to 3.450. Moreover, in order to still further ensure the advantageous effect of the present application, it is still more preferable to set the lower limit value of the conditional expression (2) to 3.510.

On the other hand, when the value of (d1t−d1w)/fw is equal to or exceeds the upper limit of the conditional expression (2) for the variable magnification optical system according to the second embodiment of the present application, the ratio of the diameter of an on-axis light flux incident on the first lens group to the diameter of an on-axis light flux incident on the second lens group largely varies in connection with zooming. Consequently, the variation in the spherical aberration becomes excessively large upon the zooming, so that the realization of high optical performance is impossible. Meanwhile, in order to further ensure the advantageous effect of the present application, it is more preferable to set the upper limit value of the conditional expression (2) to 4.000. Moreover, in order to still further ensure the advantageous effect of the present application, it is still more preferable to set the upper limit value of the conditional expression (2) to 3.860.

In the variable magnification optical system according to the second embodiment of the present application, it is desirable that the following conditional expression (4) is satisfied:

$$0.140 < (d2it - d2iw)/fw < 0.700 \qquad (4)$$

where fw denotes a focal length of the variable magnification optical system in the wide angle end state; d2iw denotes a distance from the most image side lens surface of the second lens group to an image plane in the wide angle end state, and d2it denotes a distance from the most image side lens surface of the second lens group to the image plane in the telephoto end state.

The conditional expression (4) defines a distance along the optical axis from the most image side lens surface of the second lens group to the image plane, in other words, a proper range of an amount of variation in a distance between the second lens group and the image plane upon zooming. By satisfying the conditional expression (4), the variable magnification optical system according to the second embodiment of the present application can suppress the variation in the spherical aberration and variation in the astigmatism upon zooming.

When the value of (d2it−d2iw)/fw is equal to or falls below the lower limit of the conditional expression (4) for the variable magnification optical system according to the second embodiment of the present application, in order to obtain a predetermined variable magnification ratio, it is necessary to make larger the refractive power of the second lens group. Owing to this, it becomes difficult to suppress the variation in the spherical aberration and variation in the astigmatism occurring in the second lens group upon zooming, with the result that high optical performance cannot be realized. Meanwhile, in order to further ensure the advantageous effect of the present application, it is more preferable to set the lower limit value of the conditional expression (4) to 0.170. Moreover, in order to still further ensure the advantageous effect of the present application, it is still more preferable to set the lower limit value of the conditional expression (4) to 0.200.

On the other hand, when the value of (d2it−d2iw)/fw is equal to or exceeds the upper limit of the conditional expression (4), it becomes difficult to suppress the variation in the spherical aberration and variation in the astigmatism occurring in the first lens group and the second lens group upon zooming, with the result that high optical performance cannot be realized.

In the variable magnification optical system according to the second embodiment of the present invention, it is desirable that the third lens group is composed of two lens elements. With such construction, it is possible to suppress the spherical aberration, coma aberration and axial chromatic aberration occurring in the third lens group compared with a case wherein the third lens group is composed of one lens element. It is also possible to suppress the variation in each of the spherical aberration, coma aberration and axial chromatic aberration upon zooming. Furthermore, it is possible to downsize the apparatus and additionally reduce the mass of the third lens group compared with a case wherein the third lens group is composed of three or more lens elements. Consequently, eccentricity of the third lens group due to position difference of the optical system can be relatively suppressed in its use state, with the result that the occurrence of the eccentric coma can be reduced.

It is more preferable that the third lens group is composed of two lens element and the two lens elements are cemented together. With this construction, it is possible to reduce the eccentricity among the lens elements in the third lens group so that the occurrence of the eccentric coma can be reduced.

In the variable magnification optical system according to the second embodiment of the present invention, it is desirable that an aperture stop is provided between the second lens group and the third lens group, and upon zooming from the wide-angle end state to the telephoto end state, a distance between the second lens group and the aperture stop and a distance between aperture stop and the third lens group are varied, and a distance between the aperture stop and the fourth lens group is constant. The variation in the distortion and variation in the astigmatism upon zooming can be suppressed by disposing the aperture stop between the second lens group and the third lens group, and upon zooming from the wide-angle end state to the telephoto end state, varying the distance between the second lens group and the aperture stop and the distance between the aperture stop and the third lens group. Further, the variation in the astigmatism and variation in coma aberration occurring in the third lens group in connection with zooming can be suppressed by making the distance between the aperture stop and the fourth lens group constant upon zooming.

In the variable magnification optical system according to the second embodiment of the present application, it is desirable that the following conditional expression (5) is satisfied:

$$0.200 < f3/f4 < 0.650 \quad (5)$$

where f3 denotes a focal length of the third lens group, and f4 denotes a focal length of the fourth lens group.

The conditional expression (5) defines a proper range of the ratio of focal length between the third lens group and the fourth lens. By satisfying the conditional expression (5), the variable magnification optical system according to the second embodiment of the present application can suppress the variation in the spherical aberration and variation in the astigmatism upon zooming.

When the value of f3/f4 is equal to or falls below the lower limit of the conditional expression (5) for the variable magnification optical system according to the second embodiment of the present application, it becomes difficult to suppress the variation in the spherical aberration and variation in the astigmatism occurring in the third lens group upon zooming, with the result that high optical performance cannot be realized. Meanwhile, in order to further ensure the advantageous effect of the present application, it is more preferable to set the lower limit value of the conditional expression (5) to 0.400.

On the other hand, when the value of f3/f4 is equal to or exceeds the upper limit of the conditional expression (5) for the variable magnification optical system according to the second embodiment of the present application, it becomes difficult to suppress the variation in the spherical aberration and variation in the astigmatism occurring in the fourth lens group upon zooming, with the result that high optical performance cannot be realized. Meanwhile, in order to further ensure the advantageous effect of the present application, it is more preferable to set the upper limit value of the conditional expression (5) to 0.500.

In the variable magnification optical system according to the second embodiment of the present application, it is desirable that the following conditional expression (6) is satisfied:

$$0.780 < f1/f4 < 1.300 \quad (6)$$

where f1 denotes a focal length of the first lens group, and f4 denotes a focal length of the fourth lens group.

The conditional expression (6) defines a proper range of the ratio of focal length between the first lens group and the fourth lens. By satisfying the conditional expression (6), the variable magnification optical system according to the second embodiment of the present application can suppress the variation in the spherical aberration and variation in the astigmatism upon zooming.

When the value of f1/f4 is equal to or falls below the lower limit of the conditional expression (6) for the variable magnification optical system according to the second embodiment of the present application, it becomes difficult to suppress the variation in the spherical aberration and variation in the astigmatism occurring in the first lens group upon zooming, with the result that high optical performance cannot be realized. Meanwhile, in order to further ensure the advantageous effect of the present application, it is more preferable to set the lower limit value of the conditional expression (6) to 0.820.

On the other hand, when the value of f1/f4 is equal to or exceeds the upper limit of the conditional expression (6) for the variable magnification optical system according to the second embodiment of the present application, it becomes difficult to suppress the variation in the spherical aberration and variation in the astigmatism occurring in the fourth lens group upon zooming, with the result that high optical performance cannot be realized. Meanwhile, in order to further ensure the advantageous effect of the present application, it is more preferable to set the upper limit value of the conditional expression (6) to 1.100.

In the variable magnification optical system according to the second embodiment of the present application, it is desirable that the following conditional expression (7) is satisfied:

$$0.050 < (-f2)/f4 < 0.250 \quad (7)$$

where f2 denotes a focal length of the second lens group, and f4 denotes a focal length of the fourth lens group.

The conditional expression (7) defines a proper range of the ratio of focal length between the second lens group and the fourth lens. By satisfying the conditional expression (7), the variable magnification optical system according to the second embodiment of the present application can suppress variation in each of the spherical aberration, astigmatism and distortion upon zooming.

When the value of (−f2)/f4 is equal to or falls below the lower limit of the conditional expression (7) for the variable magnification optical system according to the second embodiment of the present application, it becomes difficult to suppress variation in each of the spherical aberration, astigmatism and distortion occurring in the second lens group upon zooming, with the result that high optical performance cannot be realized. Meanwhile, in order to further ensure the advantageous effect of the present application, it is more preferable to set the lower limit value of the conditional expression (7) to 0.118.

On the other hand, when the value of (−f2)/f4 is equal to or exceeds the upper limit of the conditional expression (7) for the variable magnification optical system according to the second embodiment of the present application, it becomes difficult to suppress the variation in the spherical aberration and variation in the astigmatism occurring in the fourth lens group upon zooming, with the result that high optical performance cannot be realized. Meanwhile, in order to further ensure the advantageous effect of the present application, it is more preferable to set the upper limit value of the conditional expression (7) to 0.180.

In the variable magnification optical system according to the second embodiment of the present application, it is desirable that the following conditional expression (8) is satisfied:

$$0.740 < (-f2)/fw < 1.120 \quad (8)$$

where fw denotes a focal length of the variable magnification optical system in the wide-angle end state, and f2 denotes a focal length of the second lens group.

The conditional expression (8) defines a proper range of the focal length of the second lens group. By satisfying the conditional expression (8), the variable magnification optical system according to the second embodiment of the present application can suppress the variation in the spherical aberration and variation in the astigmatism upon zooming.

When the value of (−f2)/fw is equal to or falls below the lower limit of the conditional expression (8) for the variable magnification optical system according to the second embodiment of the present application, it becomes difficult to suppress the variation in the spherical aberration and variation in the astigmatism occurring in the second lens group upon zooming, with the result that high optical performance cannot be realized. Meanwhile, in order to further ensure the advantageous effect of the present application, it is more preferable to set the lower limit value of the conditional expression (8) to 0.860.

On the other hand, when the value of (−f2)/fw is equal to or exceeds the upper limit of the conditional expression (8) for the variable magnification optical system according to the second embodiment of the present application, in order to obtain a predetermined variable magnification ratio, it is necessary to make larger an amount of variation in the distance between the first lens group and the second lens group upon zooming. Owing to this, downsizing of the apparatus becomes difficult, and additionally, the diameter of an on-axis light flux incident from the first lens group to the second lens group largely varies in connection with zooming. Consequently, the variation in the spherical aberration becomes excessively large upon zooming, so that the realization of high optical performance is impossible. Meanwhile, in order to further ensure the advantageous effect of the present application, it is more preferable to set the upper limit value of the conditional expression (8) to 1.040.

The optical apparatus according to this application is characterized in that the apparatus is equipped with the above described variable magnification optical system according to the second embodiment of the present application. With this construction, it is possible to realize an optical apparatus which is downsized and has a high variable magnification ratio and high optical performance.

A method for manufacturing the variable magnification optical system according to the second embodiment of the present application is a method for manufacturing a variable magnification optical system comprising, in order from an object side: a first lens group having positive refractive power; a second lens group having negative refractive power; a third lens group having positive refractive power; and a fourth lens group having positive refractive power; the method comprising the steps of:

constructing the third lens group and the fourth lens group to satisfy the following conditional expression (3); and constructing such that, upon zooming from a wide-angle end state to a telephoto end state, a distance between the first lens group and the second lens group, a distance between the second lens group and the third lens group, and a distance between the third lens group and the fourth lens group are varied. With the above described configuration, it is possible to manufacture a variable magnification optical system that is downsized and has a high variable magnification ratio and high optical performance.

$$0.160 < (d3t - d3w)/fw < 0.550 \quad (3)$$

Where fw denotes a focal length of the variable magnification optical system in the wide angle end state, d3w denote a distance from the most image side lens surface of the third lens group to the most object side lens surface of the fourth lens group in the telephoto end state, and d3t denote a distance from the most image side lens surface of the third lens group to the most object side lens surface of the fourth lens group in the telephoto end state Hereinafter, variable magnification optical systems relating to numerical examples according to the first and the second embodiments of the present application will be explained with reference to the accompanying drawings. Meanwhile, the first to the third examples are common to all of the first and the second embodiments.

First Example

Figure 1B:
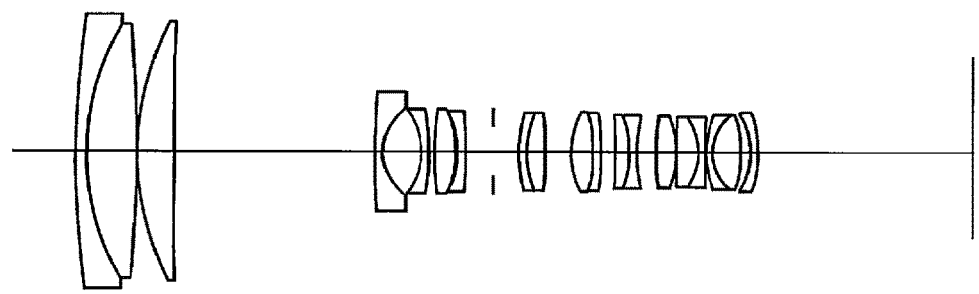
Figure 1C:
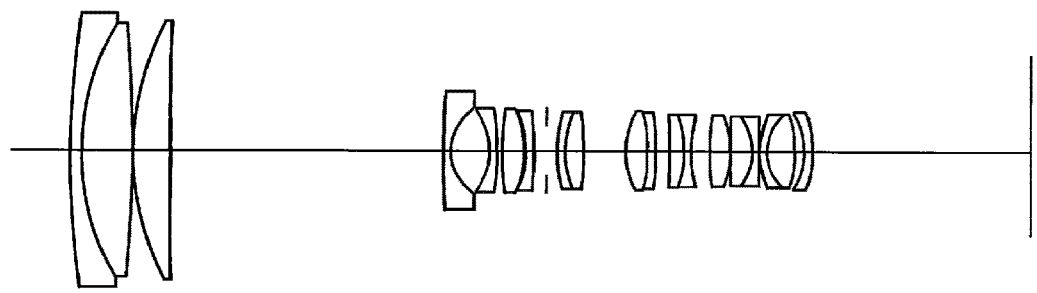

FIGS. 1A, 1B and 1C are sectional views showing a variable magnification optical system according to a first Example that is common to a first and a second embodiments of the present application, in a wide angle end state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a negative meniscus lens L22 having a concave surface facing the object side, a double convex positive lens L23, and a negative meniscus lens L24 having a concave surface facing the object side. Note that the negative meniscus lens L21 is a glass molded aspherical lens having an object side lens surface formed into an aspherical shape.

The third lens group G3 consists of, in order from the object side, a cemented lens constructed by a negative meniscus lens L31 having a convex surface facing the object side cemented with a double convex positive lens L32. Note that an aperture stop S is disposed on the object side of the third lens group G3.

The fourth lens group G4 consists of, in order from the object side, a cemented lens constructed by a double convex positive lens L401 cemented with a negative meniscus lens L402 having a convex surface facing the image side, a cemented lens constructed by a positive meniscus lens L403 having a concave surface facing the object side cemented with a double concave negative lens L404, a double convex positive lens L405, a cemented lens constructed by a positive meniscus lens L406 having a concave surface facing the object side cemented with a double concave negative lens L407, a cemented lens constructed by a negative meniscus lens L408 having a convex surface facing the object side cemented with a double convex positive lens L409, and a negative meniscus lens L410 having a concave surface facing the object side. Meanwhile, the positive meniscus lens L403 is a glass molded aspherical lens having an object side lens surface formed into an aspherical shape, and the negative meniscus lens L410 is a glass molded aspherical lens having an image side lens surface formed into an aspherical shape.

In the variable magnification optical system according to the present Example, a low-pass filter, a cover glass for sensor, or the like may be disposed between the forth lens group G4 and an image plane I.

In the variable magnification optical system according to the present Example, having the above described construction, upon zooming from the wide angle end state to the telephoto end state, the first to the fourth lens groups G1 to G4 are moved along the optical axis such that an air distance between the first lens group G1 and the second lens group G2 is increased; an air distance between the second lens group G2 and the third lens group G3 is decreased; an air distance between the third lens group G3 and the fourth lens group G4 is increased; an air distance between the second lens group G2 and the aperture stop S is decreased; an air distance between the aperture stop S and the third lens group G3 is decreased; and a distance between the aperture stop S and the fourth lens group G4 is constant. The aperture stop S is configured to move integrally with the fourth lens group G4. More specifically, the first lens group G1, the third lens group G3 and the fourth lens group G4 are moved toward the object side upon zooming. The second lens group G2 is moved toward the object side from the wide angle end to an intermediate focal length state, and toward the image side from the intermediate focal length state to the telephoto end state.

Table 1 below shows various values of the variable magnification optical system according to the present Example.

In Table 1, f denotes a focal length, and BF denotes a back focal length, in other words, a distance on the optical axis between the most image side lens surface and the image plane I.

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and vd denotes an Abbe number for d-line (wavelengthλ=587.6 nm). Further, OP denotes an object surface, and I denotes an image plane. Meanwhile, radius of curvature r=∞ denotes a plane surface. The position of an aspherical surface is expressed by attaching "*" to the surface number, and in the column of the radius of curvature r, a paraxial radius of curvature is shown. A refractive index of air nd=1.000000 is omitted.

In [Aspherical Data], with respect to an aspherical surface shown in [Surface Data], an aspherical surface coefficient and a conical coefficient are shown in the case where the aspherical surface is exhibited by the following expression:

$x=(h^2/r)/[1+[1-\kappa(h/r)^2]^{1/2}]+A4h^4+A6h^6+A8h^8+A10h^{10}$ where h denotes a vertical height from the optical axis, x denotes a sag amount which is a distance along the optical axis from the tangent surface at the vertex of the aspherical surface to the aspherical surface at the vertical height h from the optical axis, κ denotes a conical coefficient, A4, A6, A8 and A10 denote respective aspherical coefficients, and r denotes a paraxial radius of curvature that is a radius of curvature of a reference sphere. "E-n", where n is an integer, denotes "×10$^{-n}$", for example, "1.234E-05" denotes "1.234× 10$^{-5}$". The 2nd order aspherical surface coefficient A2 is 0, and omitted in the description.

In [Various Data], FNO denotes an F-number, ω denotes a half angle of view (unit "°"), Y denotes an image height, TL denotes a total length of the variable magnification optical system, that is, a distance along the optical axis from the first surface to the image plane I upon focusing on an infinite distant object, do denotes a variable interval between an n-th surface and an (n+1)-th surface, and φ is an aperture diameter of an aperture stop S. Meanwhile, W denotes a wide-angle end state, M denotes an intermediate focal length state, and T denotes a telephoto end state.

In [Lens Group Data], there are shown a starting surface number ST and a focal length f of each lens group.

In [Values for Conditional Expressions], values corresponding to respective conditional expressions for the variable magnification optical system according to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced for its dimension, the unit is not necessarily to be limited to "mm".

The explanation of reference symbols in Table 1 described above is the same in Tables for the other Examples.

TABLE 1

First Example

[Surface Data]

| m | r | d | nd | vd |
|---|---|---|---|---|
| OP | ∞ | | | |
| 1 | 134.9416 | 1.6000 | 2.001000 | 29.14 |
| 2 | 37.4620 | 7.6500 | 1.497820 | 82.57 |
| 3 | −339.5674 | 0.1000 | | |
| 4 | 41.6639 | 5.5500 | 1.883000 | 40.66 |
| 5 | 520.6025 | d5 | | |
| *6 | 2429.7649 | 1.0000 | 1.851350 | 40.10 |
| 7 | 8.6673 | 5.7500 | | |
| 8 | −10.8429 | 1.0000 | 1.487490 | 70.31 |
| 9 | −45.5363 | 0.8500 | | |
| 10 | 52.5147 | 3.1000 | 1.808090 | 22.74 |
| 11 | −17.4657 | 0.3000 | | |
| 12 | −16.1357 | 1.0000 | 1.954000 | 33.46 |
| 13 | −39.2793 | d13 | | |
| 14 | ∞ | d14 | Aperture Stop S | |
| 15 | 29.3843 | 1.0000 | 1.902650 | 35.73 |
| 16 | 14.8567 | 2.8000 | 1.719990 | 50.27 |
| 17 | −55.5590 | d17 | | |
| 18 | 13.5564 | 3.3500 | 1.497820 | 82.57 |
| 19 | −24.9755 | 1.0000 | 1.950000 | 29.37 |
| 20 | −183.0794 | 2.1500 | | |
| *21 | −145.2052 | 2.2500 | 1.802440 | 25.55 |
| 22 | −14.7800 | 1.0000 | 1.766840 | 46.78 |
| 23 | 23.7425 | 2.8000 | | |
| 24 | 25.8106 | 3.0000 | 1.516800 | 63.88 |
| 25 | −15.0644 | 0.1000 | | |
| 26 | −568.8377 | 3.0000 | 1.568830 | 56.00 |
| 27 | −9.3137 | 1.0000 | 1.954000 | 33.46 |
| 28 | 98.3635 | 0.1000 | | |
| 29 | 15.0059 | 1.0000 | 1.950000 | 29.37 |
| 30 | 7.0809 | 4.2500 | 1.647690 | 33.73 |
| 31 | −21.2496 | 1.4500 | | |
| 32 | −11.4669 | 1.0000 | 1.743300 | 49.32 |
| *33 | −29.8012 | BF | | |
| I | ∞ | | | |

TABLE 1-continued

First Example

[Aspherical Data]

| m | 6 |
|---|---|
| κ | −20.0000 |
| A4 | 9.19258E−05 |
| A6 | −6.71049E−07 |
| A8 | 3.76181E−09 |
| A10 | −1.11659E−11 |
| m | 21 |
| κ | −13.2727 |
| A4 | 1.25451E−05 |
| A6 | 1.56196E−07 |
| A8 | −2.20815E−09 |
| A10 | 0.00000E+00 |
| m | 33 |
| κ | −0.9208 |
| A4 | −8.91367E−05 |
| A6 | −1.72158E−06 |
| A8 | 2.40673E−08 |
| A10 | −6.77013E−10 |

[Various Data]
Variable magnification ratio 9.42

| | W | T |
|---|---|---|
| f | 10.30~ | 97.00 |
| FNO | 4.08~ | 5.83 |
| ω | 40.21~ | 4.78° |
| Y | 8.19~ | 8.19 |
| TL | 102.69~ | 142.60 |

| | W | M | T |
|---|---|---|---|
| f | 10.30000 | 50.00021 | 97.00042 |
| ω | 40.21108 | 9.16962 | 4.78008 |
| FNO | 4.08 | 5.79 | 5.83 |
| φ | 8.40 | 9.20 | 10.10 |
| d5 | 2.10000 | 29.30442 | 39.87067 |
| d13 | 19.87565 | 4.17251 | 2.00000 |
| d14 | 4.49060 | 3.80672 | 1.60000 |
| d17 | 3.02442 | 3.70831 | 5.91502 |
| BF | 14.04941 | 32.95254 | 34.06346 |

[Lens Group Data]

| | ST | f |
|---|---|---|
| G1 | 1 | 63.95755 |
| G2 | 6 | −10.21809 |
| G3 | 15 | 32.27954 |
| G4 | 18 | 70.96006 |

[Values for Conditional Expressions]

| (1) | f1/fw = 6.209 |
|---|---|
| (2) | (d1t − d1w)/fw = 3.667 |
| (3) | (d3t − d3w)/fw = 0.281 |
| (4) | (d2it − d2iw)/fw = 0.208 |
| (5) | f3/f4 = 0.455 |
| (6) | f1/f4 = 0.901 |
| (7) | (−f2)/f4 = 0.144 |
| (8) | (−f2)/fw = 0.992 |

Figure 2A:
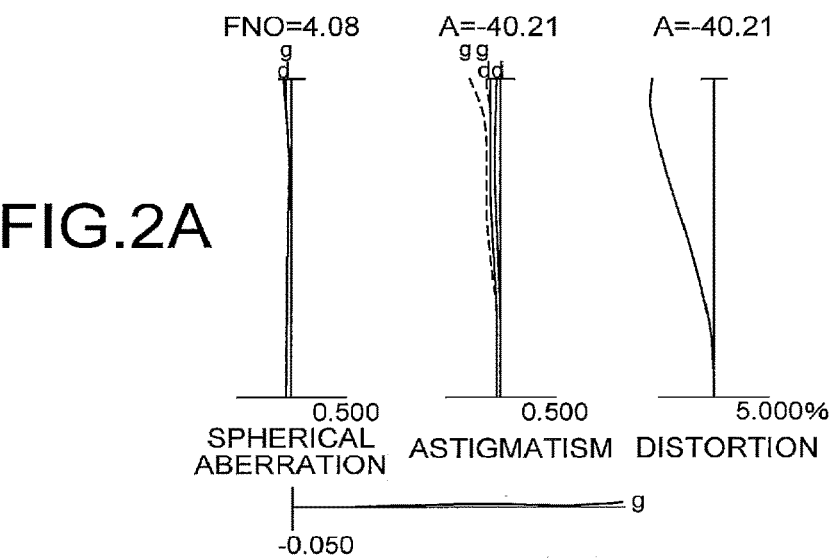
Figure 2A:
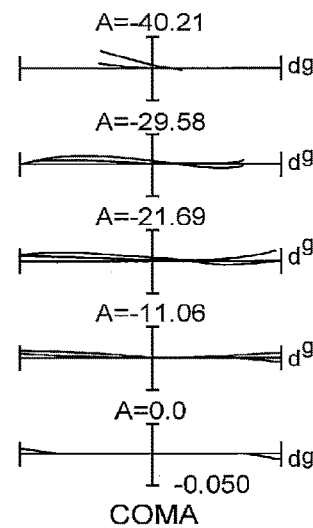
Figure 2B:
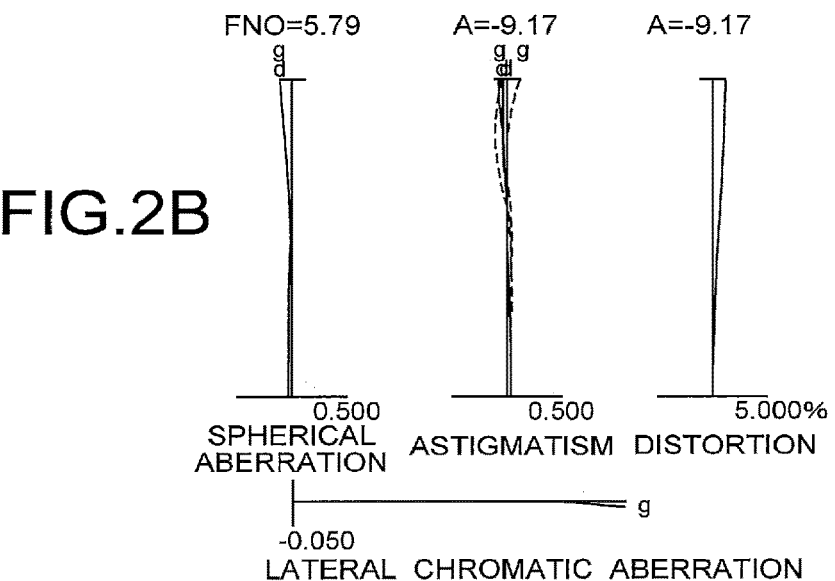
Figure 2B:
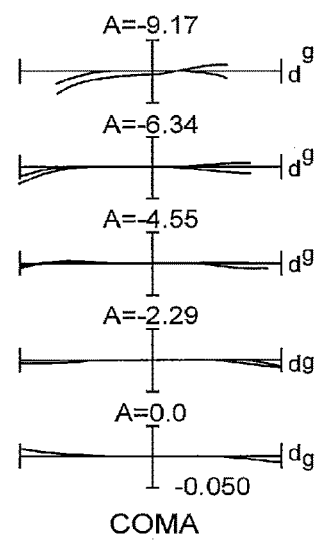
Figure 2C:
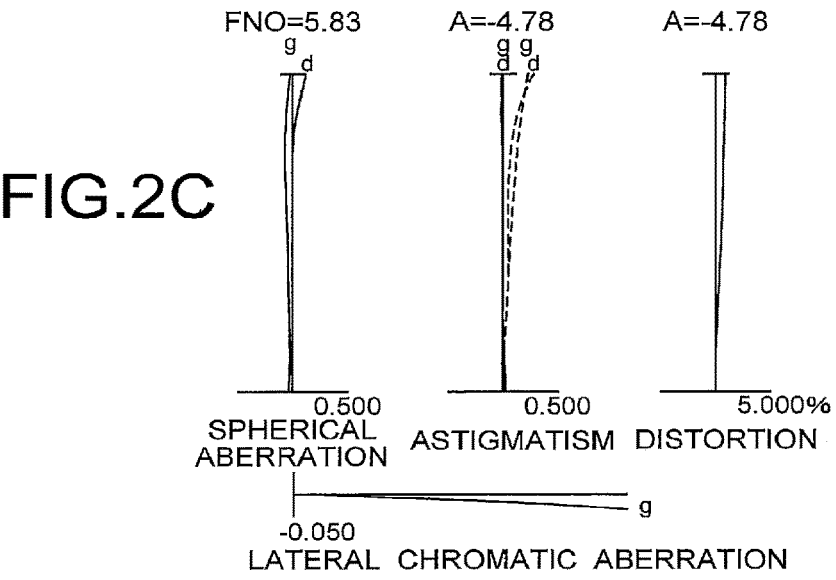
Figure 2C:
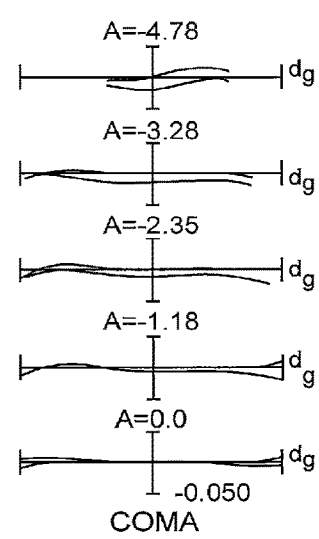

FIGS. 2A, 2B and 2C are graphs showing various aberrations of the variable magnification optical system according to the First Example of the present application upon focusing on an infinite distance object, in a wide angle end state, in an intermediate focal length state and in a telephoto end state, respectively.

In respective aberration graphs, FNO denotes an F-number, and A denotes an incidence angle of light ray, that is, a half angle of view (unit "°"). In the graphs, d denotes an aberration curve at d-line (wavelength 587.6 nm), g denotes an aberration curve at g-line (wavelength 435.8 nm), and a curve not accompanied by d and g denotes an aberration at the d-line. In the graph showing astigmatism, a solid line indicates a sagittal image plane, and a broken line indicates a meridional image plane. Incidentally, the above-described explanation regarding various aberration graphs is the same as the other Examples.

As is apparent from the respective aberration graphs, the variable magnification optical system according to the present Example shows superb optical performance as a result of good corrections to various aberrations in the states from the wide-angle end state to the telephoto end state.

Second Example

Figure 3A:
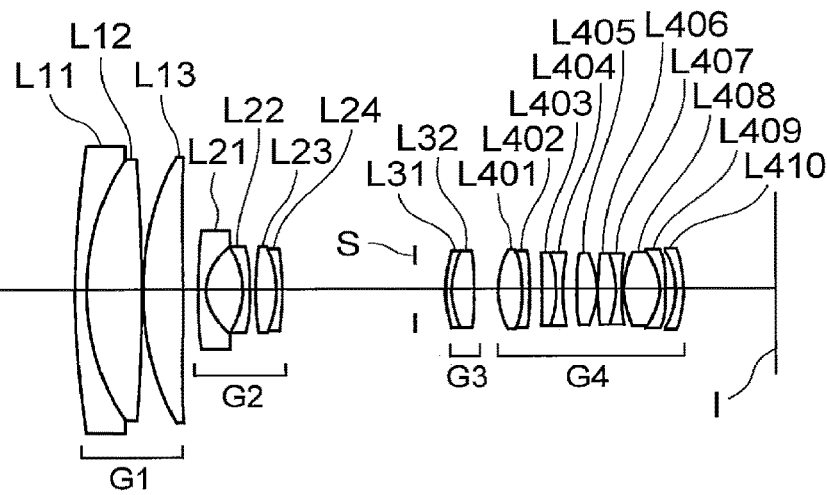
FIGS. 3A, 3B and 3C are sectional views showing a variable magnification optical system according to a Second Example that is common to the first and second embodiments of the present application, in a wide angle end state, in an intermediate focal length state and in a telephoto end state, respectively.
Figure 3B:
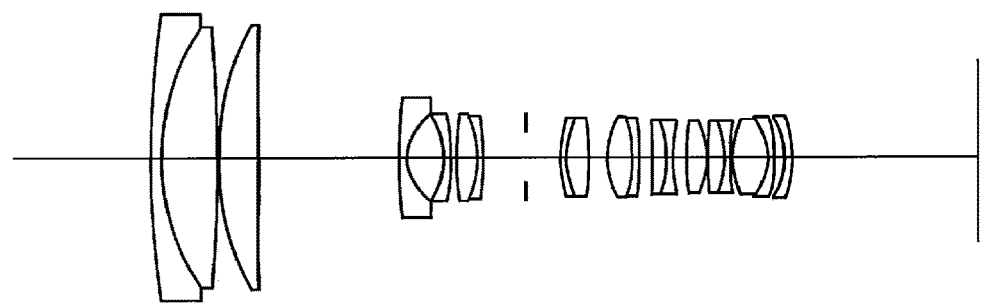
Figure 3C:
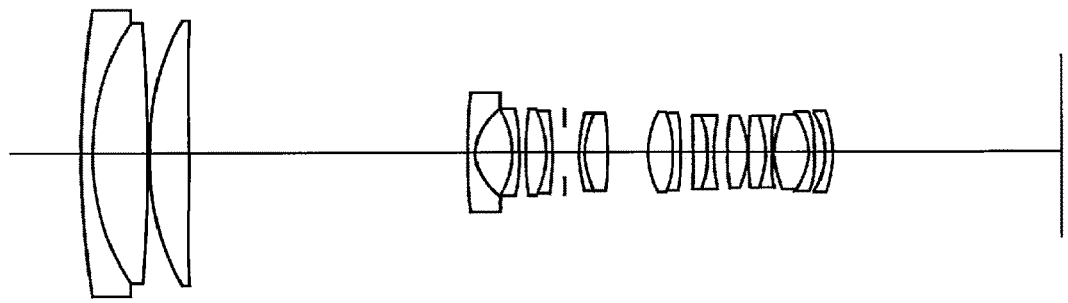

FIGS. 3A, 3B and 3C are sectional views showing a variable magnification optical system according to a Second Example that is common to the first and second embodiments of the present application, in a wide angle end state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a cemented lens constructed by a negative meniscus lens L11 having a convex surface facing the object side cemented with a double convex positive lens L12, and a plano-convex positive lens L13 having a convex surface facing the object side The second lens group G2 consists of, in order from the object side, a negative meniscus lens L21 having a convex surface facing the object side, a negative meniscus lens L22 having a concave surface facing the object side, and a cemented lens constructed by a double convex positive lens L23 cemented with a negative meniscus lens L24 having a concave surface facing the object side. The negative meniscus lens L21 is a compound type aspheric lens in which a resin layer is provided on a surface of a glass on an object side and formed into an aspherical shape.

The third lens group G3 consists of a cemented lens constructed by, in order from the object side, a negative meniscus lens L31 having a convex surface facing the object side cemented with a double convex positive lens L32.

The fourth lens group G4 consists of, in order from the object side, a cemented lens constructed by a double convex positive lens L401 cemented with a negative meniscus lens L402 having a convex surface facing the image side, a cemented lens constructed by a positive meniscus lens L403 having a concave surface facing the object side cemented with a double concave negative lens L404, a double convex positive lens L405, a cemented lens constructed by a double convex positive lens L406 cemented with a double concave negative lens L407, a cemented lens constructed by a double convex positive lens L408 cemented with a negative meniscus lens L409 having a convex surface facing the image side, and a negative meniscus lens L410 having a concave surface facing the object side. Incidentally, the negative lens L404 is a glass molded aspherical lens having an image side lens surface formed into an aspherical shape, and the negative meniscus lens L410 is a glass molded aspherical lens having an image side lens surface formed into an aspherical shape.

In the variable magnification optical system according to the present Example, a low-pass filter, a cover glass for sensor, or the like may be disposed between the forth lens group G4 and an image plane I.

In the variable magnification optical system according to the present Example, having the above described construction, upon zooming from the wide angle end state to the telephoto end state, the first to the fourth lens groups G1 to G4 are moved to the object side along the optical axis such that an air distance between the first lens group G1 and the second lens group G2 is increased; an air distance between the second lens group G2 and the third lens group G3 is decreased; an air distance between the third lens group G3 and the fourth lens group G4 is decreased from the wide angle end state to the intermediate focal length state and is increased from the intermediate focal length state to the telephoto end state; an air distance between the second lens group G2 and aperture stop S is decreased; an air distance between the aperture stop S and the third lens group G3 is increased from the wide angle end state to the intermediate focal length state and is decreased from the intermediate focal length state to the telephoto end state; and a distance between the aperture stop S and the fourth lens group G4 is constant. The aperture stop S is moved integrally with the fourth lens group G4.

Table 2 below shows various values of the variable magnification optical system according to the present Example.

TABLE 2

Second Example

[Surface Data]

| m | r | d | nd | vd |
|---|---|---|----|----|
| OP | ∞ | | | |
| 1 | 145.1831 | 1.7000 | 2.001000 | 29.14 |
| 2 | 36.6390 | 8.1000 | 1.497820 | 82.57 |
| 3 | −399.3519 | 0.1000 | | |
| 4 | 43.2076 | 6.0000 | 1.883000 | 40.66 |
| 5 | ∞ | d5 | | |
| *6 | 436.5967 | 0.1000 | 1.553890 | 38.09 |
| 7 | 87.0031 | 1.1000 | 1.834810 | 42.73 |
| 8 | 8.3001 | 5.3500 | | |
| 9 | −12.6073 | 1.0000 | 1.755000 | 52.34 |
| 10 | −32.7993 | 0.8000 | | |
| 11 | 41.1197 | 2.9500 | 1.808090 | 22.74 |
| 12 | −19.6043 | 0.9000 | 1.883000 | 40.66 |
| 13 | −73.1316 | d13 | | |
| 14 | ∞ | d14 | Aperture Stop S | |
| 15 | 22.3725 | 0.9000 | 1.902650 | 35.73 |
| 16 | 12.2299 | 3.4500 | 1.670030 | 47.14 |
| 17 | −59.6992 | d17 | | |
| 18 | 13.7390 | 3.6000 | 1.497820 | 82.57 |
| 19 | −24.8201 | 0.9000 | 2.000690 | 25.46 |
| 20 | −270.0138 | 2.2000 | | |
| 21 | −117.0547 | 2.0500 | 1.846660 | 23.80 |
| 22 | −15.9850 | 1.0000 | 1.773770 | 47.25 |
| *23 | 24.1750 | 2.0836 | | |
| 24 | 66.3654 | 2.8000 | 1.568830 | 56.00 |
| 25 | −15.4473 | 0.1000 | | |
| 26 | 44.9939 | 2.7500 | 1.517420 | 52.20 |
| 27 | −15.2012 | 0.9000 | 1.903660 | 31.27 |
| 28 | 29.9926 | 0.3000 | | |
| 29 | 14.6093 | 5.0500 | 1.672700 | 32.19 |
| 30 | −9.1997 | 0.9000 | 2.000690 | 25.46 |
| 31 | −24.3892 | 1.4000 | | |
| 32 | −12.8617 | 1.0000 | 1.851350 | 40.10 |
| *33 | −27.4946 | BF | | |
| I | ∞ | | | |

[Aspherical Data]

| m | 6 |
|---|---|
| κ | 20.0000 |

TABLE 2-continued

Second Example

| A4 | 9.17458E−05 |
|---|---|
| A6 | −6.51986E−07 |
| A8 | 2.69890E−09 |
| A10 | −1.23751E−11 |
| m | 23 |
| κ | 0.4823 |
| A4 | −7.24815E−06 |
| A6 | −3.60139E−07 |
| A8 | 4.05630E−09 |
| A10 | 0.00000E+00 |
| m | 33 |
| κ | −20.0000 |
| A4 | −1.22780E−04 |
| A6 | 8.28360E−07 |
| A8 | −6.05245E−09 |
| A10 | −9.88805E−11 |

[Various Data]
Variable magnification ratio 9.42

| | W | T |
|---|---|---|
| f | 10.30~ | 96.99 |
| FNO | 4.12~ | 5.81 |
| ω | 40.44~ | 4.73° |
| Y | 8.19~ | 8.19 |
| TL | 103.03~ | 143.32 |

| | W | M | T |
|---|---|---|---|
| f | 10.30260 | 30.00000 | 96.99284 |
| ω | 40.44283 | 14.85841 | 4.72723 |
| FNO | 4.12 | 5.48 | 5.81 |
| φ | 8.12 | 8.12 | 9.70 |
| d5 | 2.10606 | 20.13084 | 40.20889 |
| d13 | 19.66416 | 6.24359 | 1.80000 |
| d14 | 4.27874 | 4.97381 | 1.80000 |
| d17 | 3.43763 | 2.74256 | 5.91637 |
| BF | 14.05688 | 27.80535 | 34.11509 |

[Lens Group Data]

| | ST | f |
|---|---|---|
| G1 | 1 | 64.09778 |
| G2 | 6 | −10.16794 |
| G3 | 15 | 31.06055 |
| G4 | 18 | 67.05869 |

[Values for Conditional Expressions]

| (1) | f1/fw = 6.223 |
|---|---|
| (2) | (d1t − d1w)/fw = 3.699 |
| (3) | (d3t − d3w)/fw = 0.241 |
| (4) | (d2it − d2iw)/fw = 0.213 |
| (5) | f3/f4 = 0.463 |
| (6) | f1/f4 = 0.956 |
| (7) | (−f2)/f4 = 0.152 |
| (8) | (−f2)/fw = 0.986 |

Figure 4A:
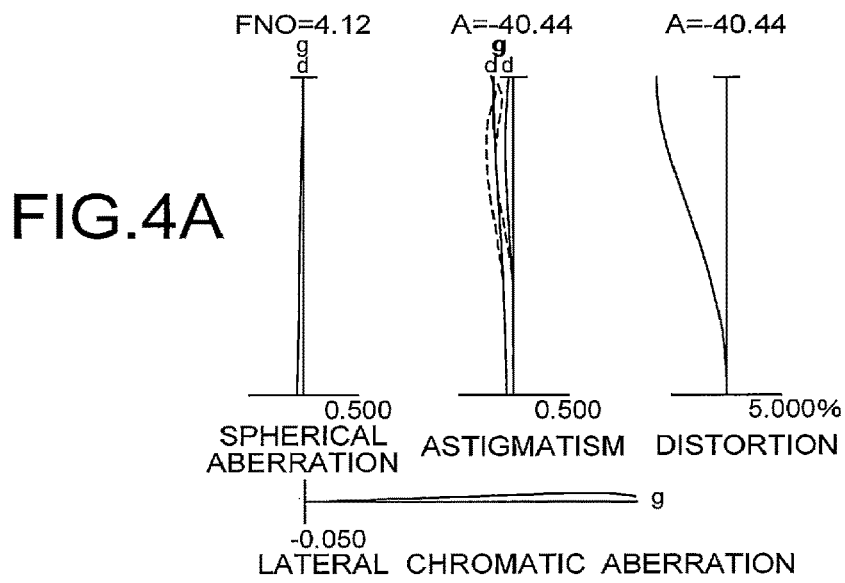
Figure 4A:
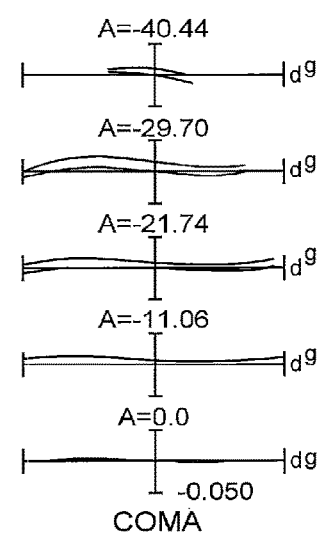
Figure 4B:
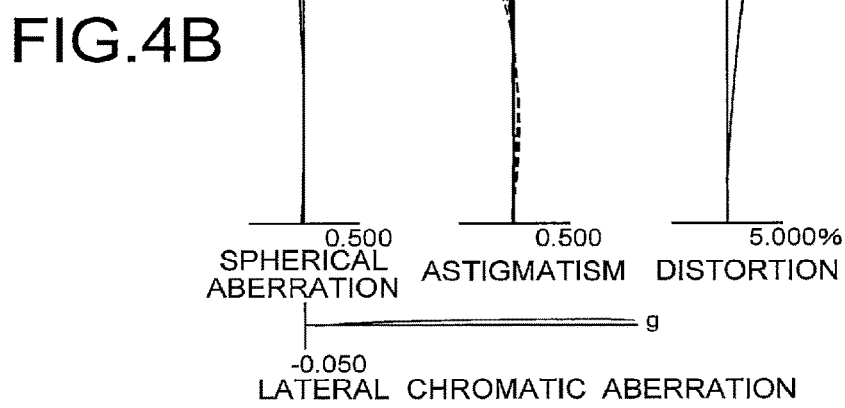
Figure 4B:
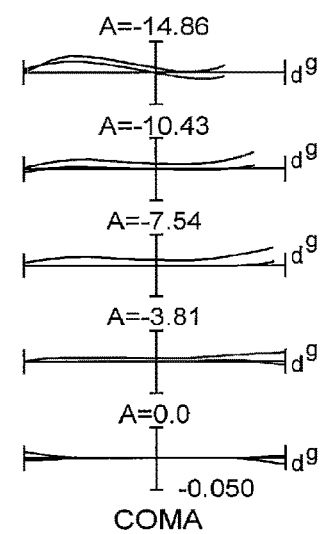
Figure 4C:
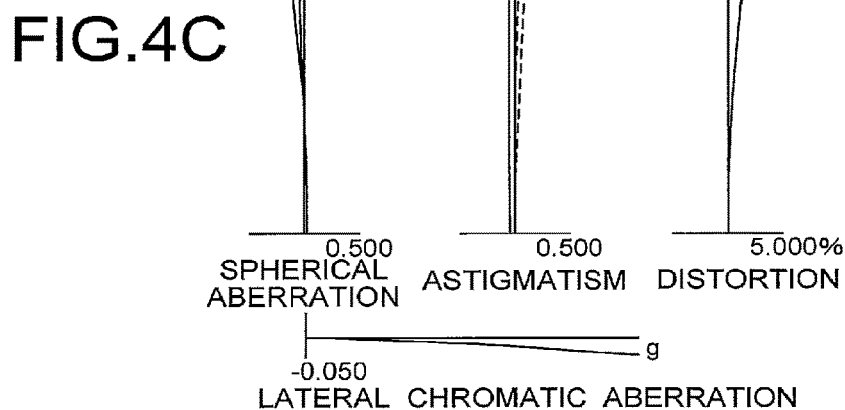
Figure 4C:
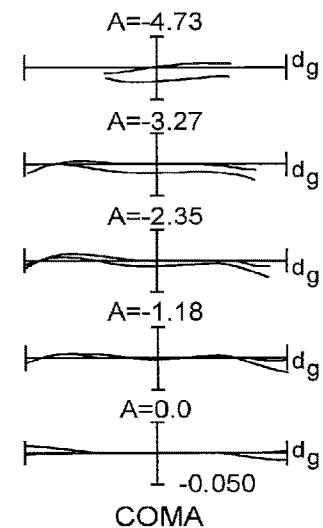

FIGS. 4A, 4B and 4C are graphs showing various aberrations of the variable magnification optical system according to the Second Example of the present application upon focusing on an infinite distance object, in a wide angle end state, in an intermediate focal length state and in a telephoto end state, respectively.

As is apparent from the respective aberration graphs, the variable magnification optical system according to the present Example shows superb optical performance as a result of good corrections to various aberrations in the states from the wide-angle end state to the telephoto end state.

Third Example

Figure 5A:
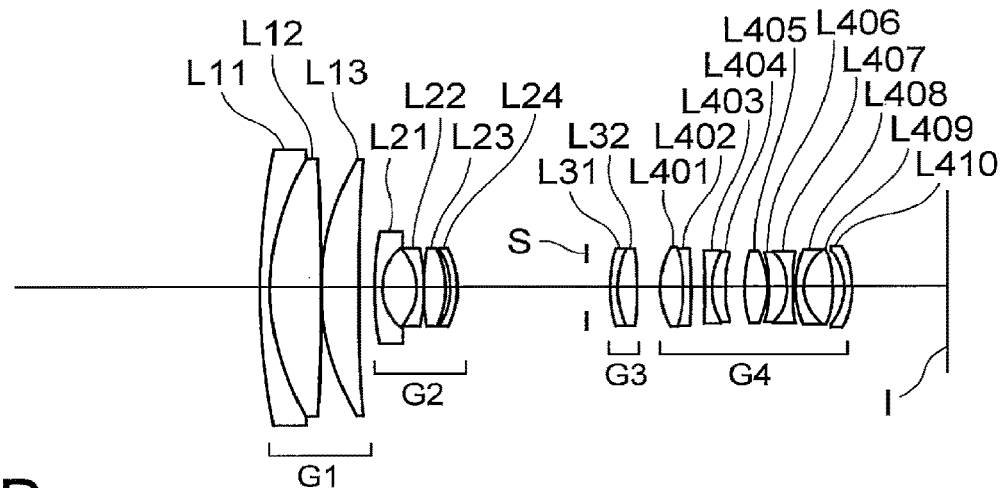
FIGS. 5A, 5B and 5C are sectional views showing a variable magnification optical system according to a Third Example that is common to the first and second embodiments of the present application, in a wide angle end state, in an intermediate focal length state and in a telephoto end state, respectively.
Figure 5B:
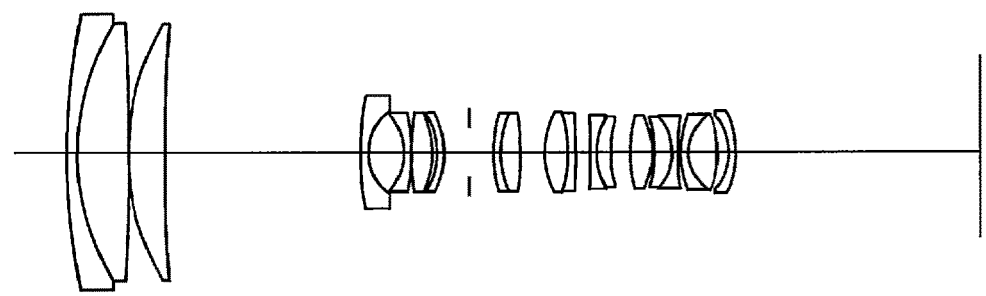
Figure 5C:
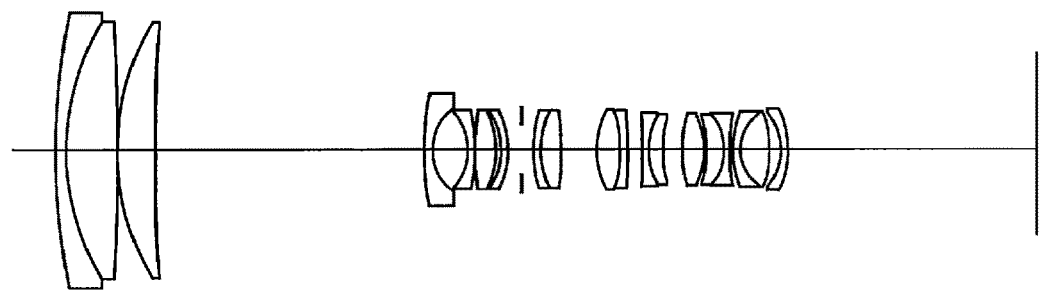

FIGS. 5A, 5B and 5C are sectional views showing a variable magnification optical system according to a Third Example that is common to the first and second embodiments of the present application, in a wide angle end state, in an intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; and a fourth lens group G4 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side The second lens group G2 consists of, in order from the object side, a negative meniscus lens L21 having a convex surface facing the object side, a negative meniscus lens L22 having a concave surface facing the object side, a double convex positive lens L23, and a negative meniscus lens L24 having a concave surface facing the object side. Note that the negative meniscus lens L21 is a glass molded aspherical lens having an object side lens surface formed into an aspherical shape.

The third lens group G3 consists of a cemented lens constructed by, in order from the object side, a negative meniscus lens L31 having a convex surface facing the object side cemented with a double convex positive lens L32. Meanwhile, an aperture stop S is provided on the object side of the third lens group G3.

The fourth lens group G4 consists of, in order from the object side, a cemented lens constructed by a double convex positive lens L401 cemented with a negative meniscus lens L402 having a convex surface facing the image side, a cemented lens constructed by a negative meniscus lens L403 having a convex surface facing the object side cemented with a positive meniscus lens L404 having a concave surface facing the image side, a double convex positive lens L405, a cemented lens constructed by a positive meniscus lens L406 having a concave surface facing the object side cemented with a negative meniscus lens L407 having a concave surface facing the object side, a cemented lens constructed by a negative meniscus lens L408 having a convex surface facing the object side cemented with a double convex positive lens L409, and a negative meniscus lens L410 having a concave surface facing the object side. Incidentally, the negative lens L403 is a glass molded aspherical lens having an object side lens surface formed into an aspherical shape, and the negative meniscus lens L410 is a glass molded aspherical lens having an image side lens surface formed into an aspherical shape.

In the variable magnification optical system according to the present Example, a low-pass filter, a cover glass for sensor, or the like may be disposed between the forth lens group G4 and an image plane I.

In the variable magnification optical system according to the present Example, having the above described construction, upon zooming from the wide angle end state to the telephoto end state, the first to the fourth lens groups G1 to G4 are moved along the optical axis such that an air distance between the first lens group G1 and the second lens group G2 is increased; an air distance between the second lens group G2 and the third lens group G3 is decreased; an air distance between the third lens group G3 and the fourth lens group G4 is increased; an air distance between the second lens group G2 and the aperture stop S is decreased; an air distance between the aperture stop S and the third lens group G3 is decreased; and an air distance between the aperture stop S and the fourth lens group G4 is constant. The aperture stop S is configured to move integrally with the fourth lens group G4. More specifically, the first lens group G1, the third lens group G3 and the fourth lens group G4 are moved toward the object side upon zooming. The second lens group G2 is moved toward the object side from the wide angle end to an intermediate focal length state, and toward the image side from the intermediate focal length state to the telephoto end state.

Table 3 below shows various values of the variable magnification optical system according to the present Example.

TABLE 3

Third Example

[Surface Data]

| m | r | d | nd | νd |
|---|---|---|---|---|
| OP | ∞ | | | |
| 1 | 100.6708 | 1.6000 | 2.003300 | 28.27 |
| 2 | 38.2945 | 7.4500 | 1.497820 | 82.57 |
| 3 | −587.4003 | 0.1000 | | |
| 4 | 40.2838 | 5.4500 | 1.834810 | 42.73 |
| 5 | 280.5337 | d5 | | |
| *6 | 202.2993 | 1.0000 | 1.851350 | 40.10 |
| 7 | 7.9721 | 5.1500 | | |
| 8 | −9.9586 | 1.0000 | 1.883000 | 40.66 |
| 9 | −44.8957 | 0.1000 | | |
| 10 | 74.4947 | 3.1500 | 1.808090 | 22.74 |
| 11 | −13.5735 | 0.6500 | | |
| 12 | −10.3252 | 1.0000 | 1.883000 | 40.66 |
| 13 | −14.1555 | d13 | | |
| 14 | ∞ | d14 | Aperture Stop S | |
| 15 | 26.4355 | 1.0000 | 1.954000 | 33.46 |
| 16 | 14.5535 | 2.9500 | 1.700000 | 48.11 |
| 17 | −46.9949 | d17 | | |
| 18 | 13.6121 | 3.5000 | 1.497820 | 82.57 |
| 19 | −26.0652 | 1.0000 | 2.000690 | 25.46 |
| 20 | −274.8099 | 2.1500 | | |
| *21 | 1292.9454 | 1.0000 | 1.806100 | 40.71 |
| 22 | 10.6698 | 2.1500 | 1.808090 | 22.74 |
| 23 | 23.0448 | 2.8000 | | |
| 24 | 19.2818 | 3.4500 | 1.548140 | 45.51 |
| 25 | −13.8291 | 0.1000 | | |
| 26 | −32.9399 | 2.8500 | 1.620040 | 36.40 |
| 27 | −8.0721 | 1.0000 | 1.954000 | 33.46 |
| 28 | −206.7578 | 0.1000 | | |
| 29 | 18.5580 | 1.0000 | 2.000690 | 25.46 |
| 30 | 7.4367 | 4.2000 | 1.647690 | 33.73 |
| 31 | −21.5339 | 1.7500 | | |
| 32 | −9.9511 | 1.0000 | 1.743300 | 49.32 |
| *33 | −17.6298 | BF | | |
| I | ∞ | | | |

[Aspherical Data]

| m | 6 |
|---|---|
| κ | 20.0000 |
| A4 | 9.82146E−05 |
| A6 | −6.04337E−07 |
| A8 | 2.59138E−09 |
| A10 | 1.16839E−11 |
| m | 21 |
| κ | 20.0000 |
| A4 | 1.53849E−05 |
| A6 | 1.73734E−07 |
| A8 | −2.83188E−09 |
| A10 | 0.00000E+00 |
| m | 33 |
| κ | 2.9454 |
| A4 | −6.43442E−05 |
| A6 | −1.32869E−06 |

TABLE 3-continued

Third Example

| A8 | 1.61809E−08 |
|---|---|
| A10 | −4.99485E−10 |

[Various Data]
Variable magnification ratio 9.42

| | W | T |
|---|---|---|
| f | 10.30~ | 97.00 |
| FNO | 4.10~ | 5.82 |
| ω | 40.21~ | 4.80° |
| Y | 8.19~ | 8.19 |
| TL | 100.18~ | 142.60 |

| | W | M | T |
|---|---|---|---|
| f | 10.30000 | 50.00015 | 97.00042 |
| ω | 40.21026 | 9.21685 | 4.79788 |
| FNO | 4.11 | 5.79 | 5.82 |
| φ | 8.50 | 9.50 | 10.24 |
| d5 | 2.10000 | 28.21026 | 39.06515 |
| d13 | 18.62936 | 3.83407 | 2.00000 |
| d14 | 3.55190 | 3.36681 | 1.60000 |
| d17 | 3.19885 | 3.38394 | 5.15075 |
| BF | 14.04944 | 35.47291 | 36.13193 |

[Lens Group Data]

| | ST | f |
|---|---|---|
| G1 | 1 | 63.38656 |
| G2 | 6 | −9.32485 |
| G3 | 15 | 30.22293 |
| G4 | 18 | 70.69668 |

[Values for Conditional Expressions]

| (1) | f1/fw = 6.154 |
|---|---|
| (2) | (d1t − d1w)/fw = 3.589 |
| (3) | (d3t − d3w)/fw = 0.190 |
| (4) | (d2it − d2iw)/fw = 0.529 |
| (5) | f3/f4 = 0.428 |
| (6) | f1/f4 = 0.897 |
| (7) | (−f2)/f4 = 0.132 |
| (8) | (−f2)/fw = 0.905 |

Figure 6A:
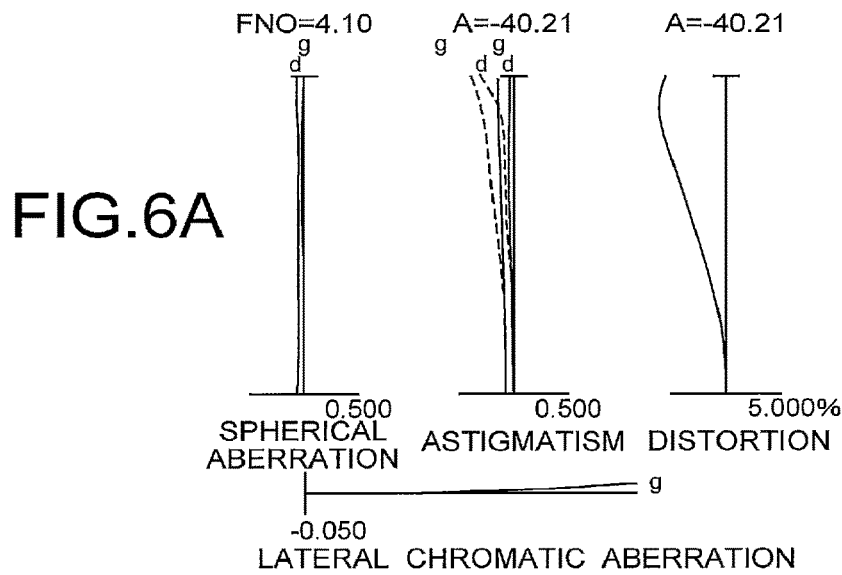
Figure 6A:
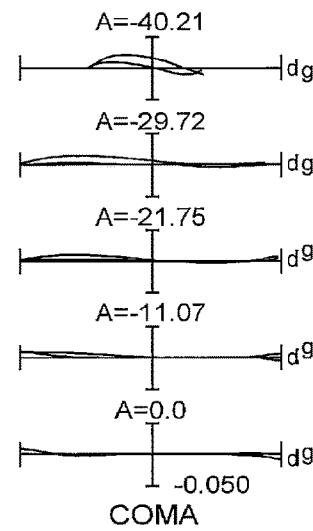
Figure 6B:
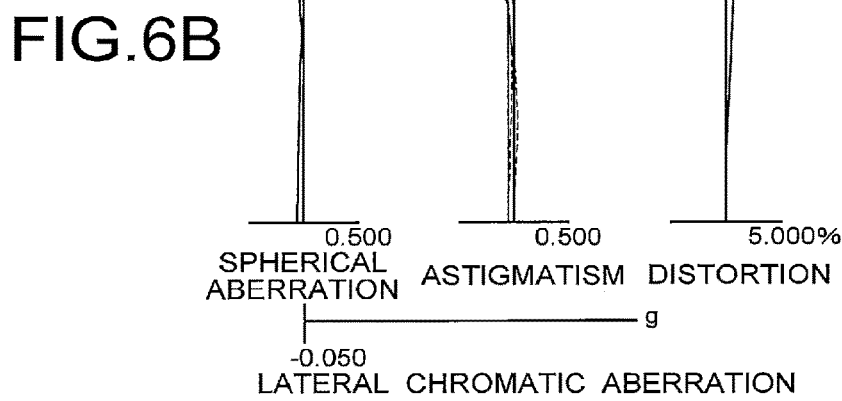
Figure 6B:
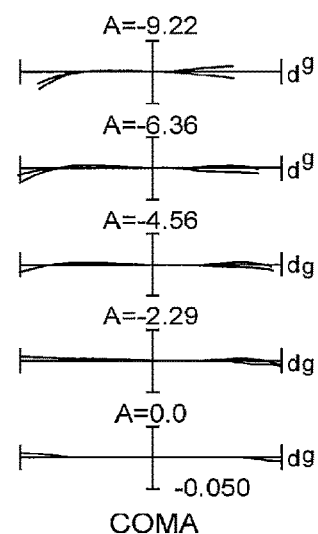
Figure 6C:
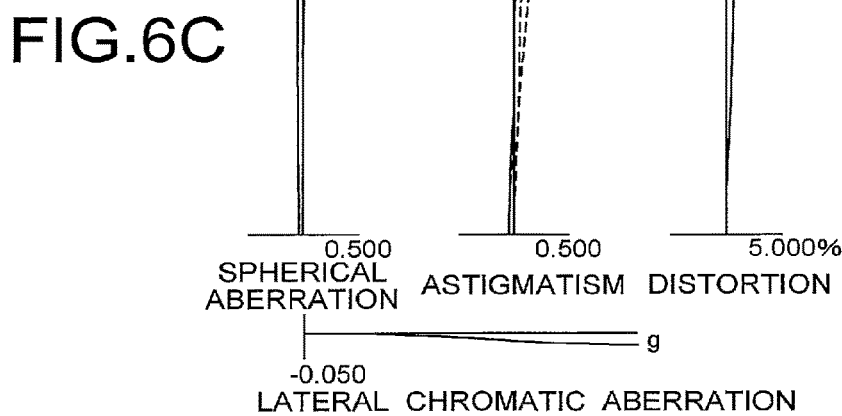
Figure 6C:
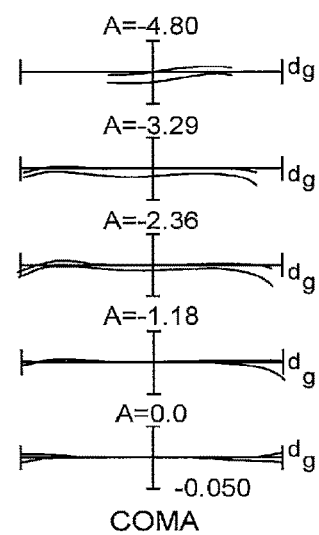

FIGS. 6A, 6B and 6C are graphs showing various aberrations of the variable magnification optical system according to the Third Example of the present application upon focusing on an infinite distance object, in a wide angle end state, in an intermediate focal length state and in a telephoto end state, respectively.

As is apparent from the respective aberration graphs, the variable magnification optical system according to the present Example shows superb optical performance as a result of good corrections to various aberrations in the states from the wide-angle end state to the telephoto end state.

With the Examples, it is possible to realize a variable magnification optical system which is downsized and has a high variable magnification ratio and high optical performance. Note that each of the above described Examples is a concrete example of the invention of the present application, and the invention of the present application is not limited to them. The contents described below can be adopted without deteriorating optical performance of the variable magnification optical systems according to the first and the second Embodiments of the present application.

Although the variable magnification optical systems each having a four group configuration were illustrated above as numerical examples of the variable magnification optical systems according to the first and the second Embodiments of the present application, the present application is not limited to them and the variable magnification optical systems having other configurations (such as five group configuration, six group configuration and the like) can be constructed. Concretely, a lens configuration in which a lens or a lens group is added to the most object side of the variable magnification optical systems according to the first and the second Embodiments of the present application is possible, and another lens configuration in which a lens or a lens group is added to the most image side thereof is also possible. It should be noted that the lens group connotes a unit having at least one lens separated from other lens groups through an air distance.

Further, in the variable magnification optical systems according to the first and the second Embodiments of the present application, in order to vary focusing from an infinitely distance object to a close object, a portion of a lens group, a single lens group in the entirety thereof, or a plurality of lens groups may be configured to move along the optical axis as a focusing lens group. It is particularly preferable that at least a portion of the second lens group, at least a portion of the third lens group, or at least a portion of the fourth lens group is moved as the focusing lens group. The focusing lens group can be used for auto focus, and suitable for being driven by a motor for auto focus, such as an ultrasonic motor.

Further, in the variable magnification optical systems according to the first and the second Embodiments of the present application, any lens group in the entirety thereof or a portion thereof can be shifted in a direction including a component perpendicular to the optical axis as a vibration reduction lens group, or rotationally moved, that is, swayed in an in-plane direction including the optical axis for correcting an image blur caused by a camera shake. Particularly, in the variable magnification optical systems according to the first and the second Embodiments of the present application, it is preferable that at least a portion of the third lens group or at least a portion of the fourth lens group is used as a vibration reduction lens group.

Further, in the variable magnification optical systems according to the first and the second Embodiments of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if the image plane is shifted, deterioration in optical performance is little, so that it is preferable. When a lens surface is an aspherical surface, the aspherical surface may be fabricated by a grinding process, a glass molding process in which a glass material is formed into an aspherical shape by a mold, or a compound type process in which a resin material provided on a glass lens surface is formed into an aspherical shape. A lens surface may be a diffractive optical surface, and a lens may be a graded-index type lens (GRIN lens) or a plastic lens.

Further, in the variable magnification optical systems according to the first and the second Embodiments of the present application, it is preferable that an aperture stop is disposed in the third lens group or in the vicinity of the third lens group, and the function may be substituted by a lens frame without disposing a member as an aperture stop.

Moreover, the lens surface(s) of the lenses configuring the variable magnification optical systems according to the first and the second Embodiments of the present application may be coated with anti-reflection coating(s) having a high transmittance in a broad wave range. With this contrivance, it is feasible to reduce a flare as well as ghost and attain high contrast and high optical performance.

Next, a camera equipped with the variable magnification optical system according to the first or the second Embodiment of the present application will be explained with referring to FIG. 7.

Figure 7:
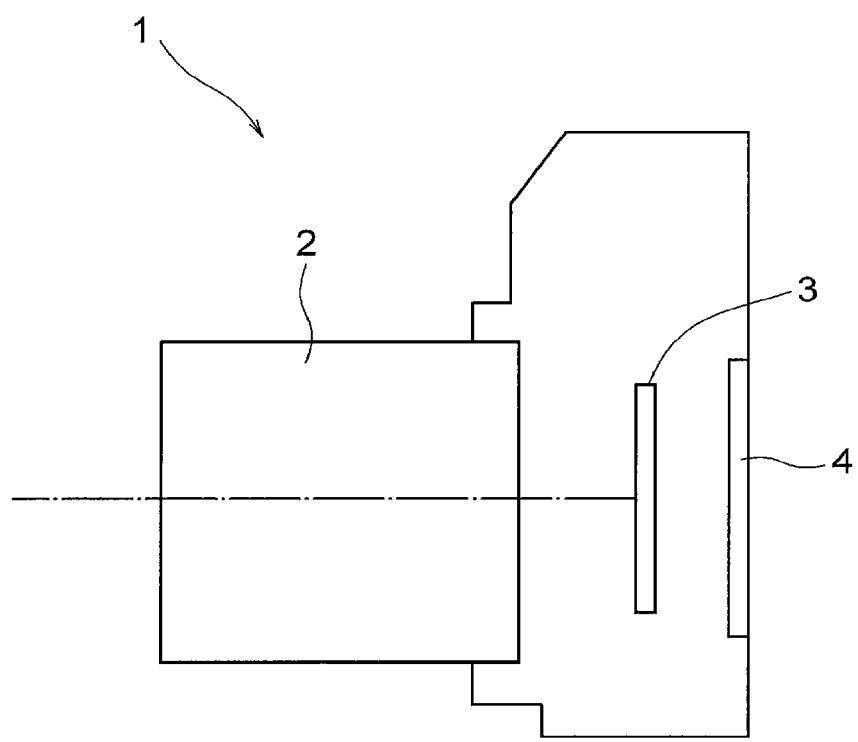
FIG. 7 is a view showing a configuration of a camera equipped with a variable magnification optical system according to the first embodiment or the second embodiment of the present application.

FIG. 7 is a view showing a configuration of a camera equipped with the variable magnification optical system according to the first or the second Embodiment of the present application.

The present camera 1 shown in FIG. 7 is a so-called mirrorless camera with interchangeable lenses equipped with the variable magnification optical system according to the first Example as an imaging lens 2.

In the present camera 1, light emitted from an unillustrated object as a subject is converged by the imaging lens 2, so that a subject image is formed on an imaging surface (plane) of an imaging part 3 through an unillustrated OLPF (optical low pass filter). The subject image then undergoes photoelectric conversion with a photoelectric conversion device in the imaging part 3 to produce an image of the subject. The image is displayed on an EVF 4 (electronic view finder) mounted on the camera 1. Accordingly, a photographer can observe the subject through the EVF 4.

Moreover, when the photographer presses an unillustrated release button down, the subject image generated in the imaging part 3 is stored in an unillustrated memory. In this manner, the photographer can take a picture of a subject by the camera 1.

Here, the variable magnification optical system according to the first Example installed as the imaging lens 2 in the camera 1 is a variable magnification optical system that is downsized and has a high variable magnification ratio and high optical performances. Accordingly, the present camera 1 can realize excellent optical performances while achieving downsizing and high variable magnification ratio. Incidentally, even if a variable magnification optical system according to the second or the third Example is installed as an imaging lens 2 in a camera, the same effect as the camera 1 can be obtained. Further, even if a variable magnification optical system according to each of the above described Examples is installed in a single-lens reflex camera, which includes a quick return mirror and is capable of observing a subject through a finder optical system, the same effect as the camera 1 can be obtained.

Figure 8:
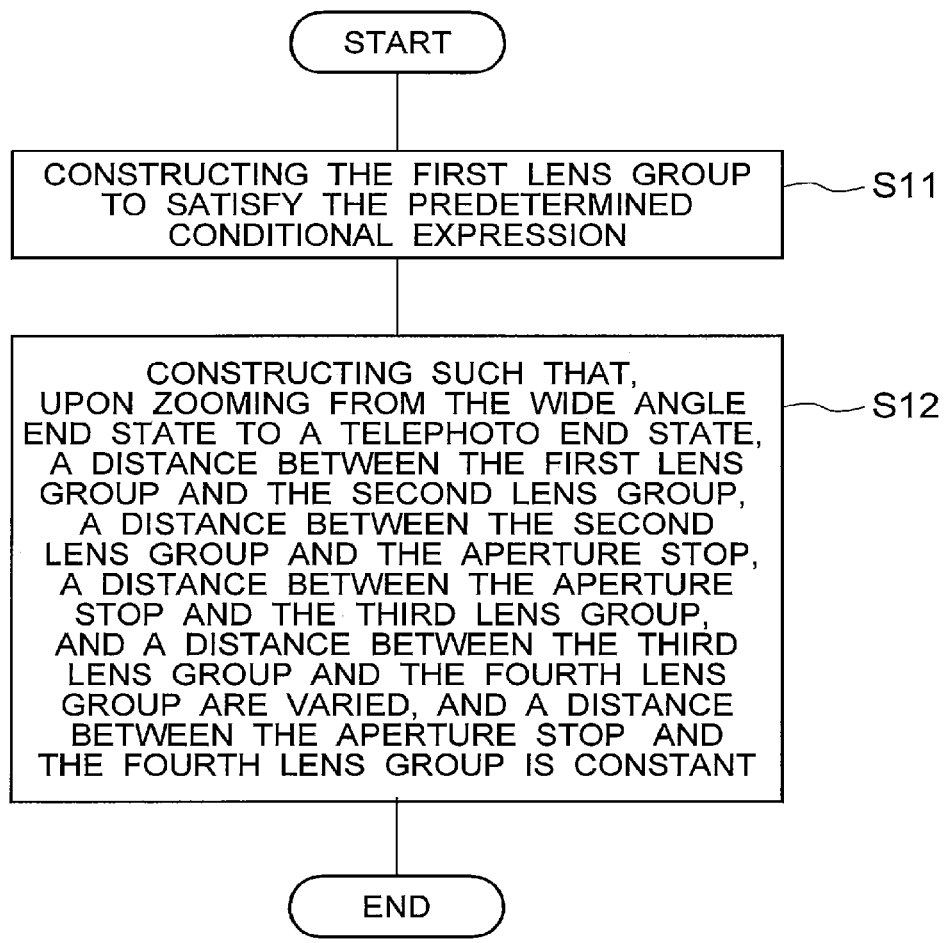
FIG. 8 is a flowchart schematically showing a method for manufacturing the variable magnification optical system according to the first embodiment of the present application.

Finally, an outline of a method for manufacturing a variable magnification optical system according to the first and the second Embodiments of the present application is described with referring to FIGS. 8 and 9.

The method for manufacturing the variable magnification optical system according to the first embodiment of the present application shown in FIG. 8 is a method for manufacturing a variable magnification optical system comprising, in order from an object side: a first lens group having positive refractive power; a second lens group having negative refractive power; an aperture stop, a third lens group having positive refractive power; and a fourth lens group having positive refractive power; and the method comprises the following steps of S11 and S12:

Step S11: Constructing the first lens group to satisfy the following conditional expression (1) and disposing the first to the fourth lens groups in a lens barrel in order from an object side:

$$5.300 < f1/fw < 8.000 \qquad (1)$$

where fw denotes a focal length of the variable magnification optical system in a wide angle end state, and f1 denotes a focal length of the first lens group.

Step S12: Providing a known movement mechanism in a lens barrel and constructing such that, upon zooming from the wide angle end state to a telephoto end state, a distance between the first lens group and the second lens group, a distance between the second lens group and the aperture stop, a distance between the aperture stop and the third lens group, and a distance between the third lens group and the fourth lens group are varied, and a distance between the aperture stop and the fourth lens group is constant.

The method for manufacturing the variable magnification optical system according to the first embodiment of the present application makes it possible to manufacture a variable magnification optical system which is compact in size and has a high variable magnification ratio and high optical performance.

The method for manufacturing the variable magnification optical system according to the second embodiment of the present application shown in FIG. 9 is a method for manufacturing a variable magnification optical system comprising, in order from an object side: a first lens group having positive refractive power; a second lens group having negative refractive power; a third lens group having positive refractive power; and a fourth lens group having positive refractive power; and the method comprises the following steps of S21 and S22:

Step S21: Constructing the third lens group and the forth lens group to satisfy the following conditional expression (3) and disposing the first to the fourth lens groups in a lens barrel in order from an object side:

$$0.160 < (d3t - d3w)/fw < 0.550 \qquad (3)$$

where fw denotes a focal length of the variable magnification optical system in a wide angle end state, d3w denotes a distance from the most image side lens surface of the third lens group to the most object side lens surface of the fourth lens group in the wide angle end state, and d3t denotes a distance from the most image side lens surface of the third lens group to the most object side lens surface of the fourth lens group in a telephoto end state.

Step S22: Providing a known movement mechanism in a lens barrel and constructing such that, upon zooming from the wide angle end state to the telephoto end state, a distance between the first lens group and the second lens group, a distance between the second lens group and the third lens group, and a distance between the third lens group and the fourth lens group are varied.

The method for manufacturing the variable magnification optical system according to the second embodiment of the present application makes it possible to manufacture a variable magnification optical system which is compact in size and has a high variable magnification ratio and excellent optical performance.

What is claimed is:

1. A variable magnification optical system comprising, in order from an object side: a first lens group having positive refractive power; a second lens group having negative refractive power; an aperture stop; a third lens group having positive refractive power; and a fourth lens group having positive refractive power;

upon zooming from a wide-angle end state to a telephoto end state, a distance between the first lens group and the second lens group, a distance between the second lens group and the aperture stop, a distance between the aperture stop and the third lens group, and a distance between the third lens group and the fourth lens group being varied, and a distance between the aperture stop and the fourth lens group being constant; and the following conditional expressions being satisfied:

$$5.300 < f1/fw < 8.000$$

$$0.140 < (d2it-d2iw)/fw < 0.700$$

where fw denotes a focal length of the variable magnification optical system in the wide angle end state, f1 denotes a focal length of the first lens group, d2iw denotes a distance from the most image side lens surface of the second lens group to an image plane in the wide angle end state, and d2it denotes a distance from the most image side lens surface of the second lens group to the image plane in the telephoto end state.

2. The variable magnification optical system according to claim 1, wherein upon zooming from the wide-angle end state to the telephoto end state, the first lens group is moved toward the object side.

3. The variable magnification optical system according to claim 1, wherein upon zooming from the wide-angle end state to the telephoto end state, the distance between the first lens group and the second lens group is increased.

4. The variable magnification optical system according to claim 1, wherein upon zooming from the wide-angle end state to the telephoto end state, the distance between the second lens group and the third lens group is decreased.

5. The variable magnification optical system according to claim 1, wherein the following conditional expression is satisfied:

$$3.250 < (d1t-d1w)/fw < 4.200$$

where fw denotes a focal length of the variable magnification optical system in the wide angle end state; d1w denotes a distance from the most image side lens surface of the first lens group to the most object side lens surface of the second lens group in the wide angle end state; and d1t denotes a distance from the most image side lens surface of the first lens group to the most object side lens surface of the second lens group in the telephoto end state.

6. The variable magnification optical system according to claim 1, wherein the following conditional expression is satisfied:

$$0.160 < (d3t-d3w)/fw < 0.550$$

where fw denotes a focal length of the variable magnification optical system in the wide angle end state; d3w denotes a distance from the most image side lens surface of the third lens group to the most object side lens surface of the fourth lens group in the wide angle end state; and d3t denotes a distance from the most image side lens surface of the third lens group to the most object side lens surface of the fourth lens group in the telephoto end state.

7. The variable magnification optical system according to claim 1, wherein the third lens group consists of two lenses.

8. The variable magnification optical system according to claim 1, wherein the following conditional expression is satisfied:

$$0.200 < f3/f4 < 0.650$$

where f3 denotes a focal length of the third lens group, and f4 denotes a focal length of the fourth lens group.

9. The variable magnification optical system according to claim 1, wherein the following conditional expression is satisfied:

$$0.780 < f1/f4 < 1.300$$

where f1 denotes a focal length of the first lens group, and f4 denotes a focal length of the fourth lens group.

10. The variable magnification optical system according to claim 1, wherein the following conditional expression is satisfied:

$$0.740 < (-f2)/fw < 1.120$$

where fw denotes a focal length of the variable magnification optical system in the wide-angle end state, and f2 denotes a focal length of the second lens group.

11. An optical apparatus equipped with the variable magnification optical system according to claim 1.

12. A variable magnification optical system comprising, in order from an object side: a first lens group having positive refractive power; a second lens group having negative refractive power; an aperture stop; a third lens group having positive refractive power; and a fourth lens group having positive refractive power;

upon zooming from a wide-angle end state to a telephoto end state, a distance between the first lens group and the second lens group, a distance between the second lens group and the aperture stop, a distance between the aperture stop and the third lens group, and a distance between the third lens group and the fourth lens group being varied, and a distance between the aperture stop and the fourth lens group being constant; and the following conditional expressions being satisfied:

$$5.300 < f1/fw < 8.000$$

$$0.200 < f3/f4 < 0.650$$

where fw denotes a focal length of the variable magnification optical system in the wide angle end state, f1 denotes a focal length of the first lens group, f3 denotes a focal length of the third lens group, and f4 denotes a focal length of the fourth lens group.

13. A variable magnification optical system comprising, in order from an object side: a first lens group having positive refractive power; a second lens group having negative refractive power; an aperture stop; a third lens group having positive refractive power; and a fourth lens group having positive refractive power;

upon zooming from a wide-angle end state to a telephoto end state, a distance between the first lens group and the second lens group, a distance between the second lens group and the aperture stop, a distance between the aperture stop and the third lens group, and a distance between the third lens group and the fourth lens group being varied, and a distance between the aperture stop and the fourth lens group being constant; and the following conditional expressions being satisfied:

$$5.300 < f1/fw < 8.000$$

$$0.780 < f1/f4 < 1.300$$

where fw denotes a focal length of the variable magnification optical system in the wide angle end state, f1 denotes a focal length of the first lens group, and f4 denotes a focal length of the fourth lens group.

14. A method for manufacturing a variable magnification optical system comprising, in order from an object side: a first lens group having positive refractive power; a second lens group having negative refractive power; an aperture stop; a third lens group having positive refractive power; and a fourth lens group having positive refractive power;

the method comprising the steps of:

constructing the first lens group to satisfy the following conditional expression:

$$5.300 < f1/fw < 8.000$$

where fw denotes a focal length of the variable magnification optical system in a wide angle end state, and f1 denotes a focal length of the first lens group; and constructing such that, upon zooming from the wide angle end state to a telephoto end state, a distance between the first lens group and the second lens group, a distance between the second lens group and the aperture stop, a distance between the aperture stop and the third lens group, and a distance between the third lens group and the fourth lens group are varied, and a distance between the aperture stop and the fourth lens group is constant, the method further comprising one or more of the following steps (A) to (C):

(A) satisfying the following conditional expression:

$$0.140 < (d2it - d2iw)/fw < 0.700$$

where d2iw denotes a distance from the most image side lens surface of the second lens group to an image plane in the wide angle end state, and d2it denotes a distance from the most image side lens surface of the second lens group to the image plane in the telephoto end state, (B) satisfying the following conditional expression:

$$0.200 < f3/f4 < 0.650$$

where f3 denotes a focal length of the third lens group, and f4 denotes a focal length of the fourth lens group, (C) satisfying the following conditional expression:

$$0.780 < f1/f4 < 1.300.$$

* * * * *